(12) United States Patent
Goldman et al.

(10) Patent No.: US 8,773,437 B1
(45) Date of Patent: *Jul. 8, 2014

(54) WEIGHTING PATHS IN A SOCIAL GRAPH BASED ON TIME

(75) Inventors: Neal Goldman, New York, NY (US); John C. Dingee, Bronxville, NY (US); Scott Penberthy, Croton on Hudson, NY (US)

(73) Assignee: Relationship Science LLC, New York, NY (US)

( * ) Notice: Subject to any disclaimer, the term of this patent is extended or adjusted under 35 U.S.C. 154(b) by 197 days.

This patent is subject to a terminal disclaimer.

(21) Appl. No.: 13/224,138

(22) Filed: Sep. 1, 2011

Related U.S. Application Data

(60) Provisional application No. 61/507,106, filed on Jul. 12, 2011.

(51) Int. Cl.
*G06T 11/20* (2006.01)

(52) U.S. Cl.
USPC .......................................................... 345/440

(58) Field of Classification Search
None
See application file for complete search history.

(56) References Cited

U.S. PATENT DOCUMENTS

| | | | |
|---|---|---|---|
| 2003/0187813 A1 | 10/2003 | Goldman et al. | |
| 2006/0136419 A1 | 6/2006 | Brydon et al. | |
| 2009/0027392 A1* | 1/2009 | Jadhav et al. | 345/440 |
| 2009/0259599 A1 | 10/2009 | Wallman | |
| 2010/0119053 A1 | 5/2010 | Goeldi | |
| 2010/0153185 A1 | 6/2010 | Ghosh et al. | |
| 2010/0241638 A1 | 9/2010 | O'Sullivan et al. | |
| 2011/0037766 A1* | 2/2011 | Judy et al. | 345/440 |
| 2011/0173046 A1 | 7/2011 | Dey et al. | |
| 2011/0295626 A1 | 12/2011 | Chen et al. | |
| 2012/0079023 A1 | 3/2012 | Tejada-Gamero et al. | |
| 2012/0096002 A1 | 4/2012 | Sheehan et al. | |
| 2012/0209832 A1 | 8/2012 | Neystadt et al. | |
| 2012/0232998 A1 | 9/2012 | Schoen | |
| 2013/0135314 A1* | 5/2013 | Haggerty et al. | 345/440 |

OTHER PUBLICATIONS

U.S. Appl. No. 13/548,191, filed Jul. 12, 2012, available via IFW (see file history incl. office action with notification date of Jan. 27, 2014).
U.S. Appl. No. 13/240,369, filed Jul. 12, 2012, available via IFW (see file history incl. office action with notification date of Jan. 27, 2014).
U.S. Appl. No. 13/225,380, filed Sep. 2, 2011, available via IFW (see file history incl. office action with notification date of Feb. 6, 2014).

* cited by examiner

*Primary Examiner* — Kee M Tung
*Assistant Examiner* — William Beutel
(74) *Attorney, Agent, or Firm* — Aka Chan LLP

(57) ABSTRACT

A system gathers information on important and influential people and builds a social graph. The social graph can be processed to determine the influence of a node in the graph or a subsection of the graph. For the influence in a subsection of the graph, only nodes with a specific type of relationship or concept is included in the influence calculation. For example, for the concept art, only relationship that have to do with art are included in the influence calculation (e.g., museum, artists, musician). In an implementation, the edge-weight of edges of the system change according to time.

20 Claims, 25 Drawing Sheets

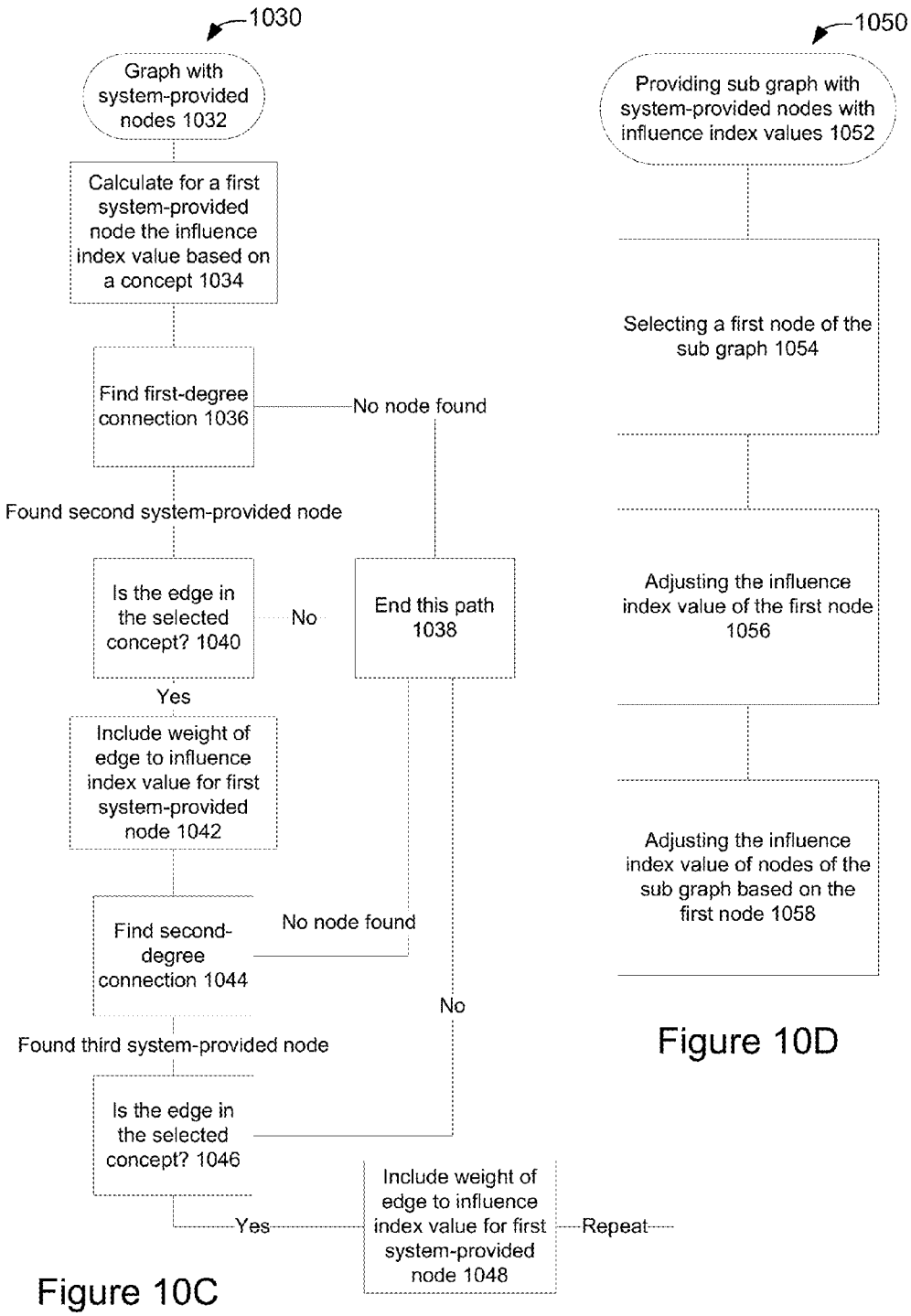

WEIGHTING PATHS IN A SOCIAL GRAPH BASED ON TIME

CROSS-REFERENCE TO RELATED APPLICATIONS

This patent application claims the benefit of U.S. provisional patent application 61/507,106, filed Jul. 12, 2011 which is incorporated by reference along with all other references cited in this application.

BACKGROUND OF THE INVENTION

The present invention relates to the field of information management, and more specifically, to providing an information resource where the content is organized using a social graph.

In business, there is an adage: "the right ten minutes in front of the right person is worth more than a year at your desk." This is because it is people that make things happen, and connecting with the right person can give you the resources, access or credibility you may need to advance your business.

So, often the questions become who is the right person, how do I get in front of them, and how do I "emotionally connect" with them in the first few minutes so that they take a liking to me, listen to the rest of my presentation, and want to help me.

Most business people are constantly trying to advance their career by creating the "right" relationships. It is a complicated task figuring out who those people are, meeting them, and building a relationship. Each of these is a specific task.

Most executives try to "do their homework" in this regard. For instance: (1) I am going to a conference: who do I want to meet there and what should I say if I meet them? (2) I am going to a meeting: I know who the other people are going to be in attendance, but what can I know about them to make my meeting more successful? (3) I want to meet someone: who do I know who can introduce me? (4) I want to get someone as a client: how do I sound knowledgeable about their particular lives and issues to demonstrate sensitivity to their concerns? There are many more such use cases.

Some social networks include Facebook™ and LinkedIn™. Trademarks indicated in this patent application are the property of their respective owners. If the world is a pyramid of people, with the "most important" being at the top, Facebook is the masses at the bottom and LinkedIn is the middle-level managers in the middle. However, there is no social network that caters to the world's most "influential people," in large part because these people generally keep a low profile, do not promote themselves, and generally do not want the general public contacting through electronic means.

On-line services, libraries, and information resources are available to assist users to research people (often important and influential) that they want to make a connection to. The information is, however, typically presented in a flat format. Even if hyperlinked, the information is still not presented in a way to easily show connections between a targeted individual and other people, and how the targeted individual might be connected to the user.

Therefore, there is a need to provide an information resource where information is also organized according to a social graph or social network, which shows the connections between people, especially influential people.

BRIEF SUMMARY OF THE INVENTION

A system gathers information on important and influential people and builds a social graph. The information is organized based on this social graph and provided to users as a service. The system has an ontology and analytics to organize the people according to their overall power or influence (which can be called a influence index value) as well as their influence in a particular domain, relationships to other people or organizations, influence over others, indirect influences, and more. Users can enter as nodes in the social graph to explore potential relationships and commonalities with the influential people. Information in the social graph is continually updated as new news and information becomes available. Users can request and receive reports on people of interest as information is updated.

The system creates an extensive database and technology product that tracks the estimated one and a half million most important or influential people in the United States and in the world. In an implementation, the system is not a social network like Facebook or MySpace. Users or subscribers of the system are not asked to contribute any data, but the users can provide information about themselves so the system can determine any links they might have to the people being tracked. The system uses a vast array of publicly available data sources, both on-line and not on-line, to create deep and rich profiles on people—their business life, their personal life and who they know. This is not just who these people know in a business context, but who are their friends and others who have "real world" influence over them (and vice versa).

In additional to "important" people, there are some very key hubs of connectivity and influence. For instance, a well-respected divorce attorney who has developed very close relationships with his or her clients over the years, can potentially be a powerful connector in society. The information on who they know can be valuable to a user. In another example, relationships of a respected person running a well-respected nonprofit is tracked. This person may know large donors (who themselves are very important) to the nonprofit.

Additionally, the system allows subscribers (such as people who pay a monthly fee to access to the system through the Internet) to create their own profile. The system can include for example, where they went to school, where they worked, what types of nonprofit interests they have, clubs they belong to, where they grew up, and who they know. In an implementation, this profile is not seen by any other user or subscriber of the system. The profile may be protected and not shown to others unless explicitly granted permission, but allows the system to customize itself to the user. So, if a subscriber pulled up the profile of an important person they would immediately see "who do I know in common with this person" and "what other interests or facts do I share in common with this person." In essence, the system can do the work of telling a user how to get to anyone and what to say to them to bond with the person within a few minutes. There are many applications for the system and some examples are described below.

Most executives do some version of this work already. They do Google searches (or have their assistant do it), which returns a very verbose, spotty, incomplete, and unsynthesized view of a person. Then, they have to read it all to try and understand how they might relate to the person. This costs time and money and is very inefficient. The system makes this information available more easily.

In an implementation, the method includes: providing a service accessible through the Internet to client devices, the service presenting information on entities, where the entities stored in a social graph structure using nodes, and edges between the nodes represent relationships between the entities; and performing analytics on the nodes of the social graph including calculating a weight value for each edge of the graph, wherein the calculating a weight value includes obtaining a combined function versus time for the two nodes coupled together by an edge; and selecting a weight value for the edge based on the combined function. The selecting a weight value includes selecting a maximum weight value of the combined function. The method can include calculating a weight value by scaling the combined function relative to other nodes in the graph. The method can include: at a client device, displaying information for an entity, represented by a node of the graph, and an influence value of a first node over a second node comprises a calculation including a weight value obtained from function obtained between the first and second nodes.

The method can also include: adding users at the client devices into the social graph structure as ghost nodes; for a first user, displaying information for an entity in the social graph, where the performing analytics considers only edges connecting to a ghost node of the first user and not of other users of the service. In an implementation, the method includes for a second user, displaying information for an entity in the social graph, where the performing analytics considers only edges connecting to a ghost node of the second user and not to the first user. In another implementation, the method includes: obtaining a first function versus time for a first node; obtaining a second function versus time for a second node, wherein the second node is coupled to the first node through an edge; combining the first function and second function together by superposition to obtained a combined function for the first and second nodes; and normalizing the combined function for the first and second nodes to other nodes in the graph.

The method can also include when combining the first function and second function together, adding values of the first function and second function together. The method can include selecting a weighting value for the edge between the first and second nodes, where the weighting value occurs in the combined function where the first and second functions overlap. The first function can have a constant value over time. The second function can have a diminishing value after a particular time.

In various implementations, the method can include: providing a graph with system-provided nodes, wherein each node is coupled to other system-provided nodes via one or more edges and each edge comprises a value for a concept category; providing first system-provided node; providing a second system-provided node; creating a first system-provided edge to couple the first and second system-provided nodes; calculating a first edge-weight value to assign to the first edge including: determining a first edge-weight function for the first system-provided node, where the first edge-weight function gives an edge-weight output value for the first system-provided node as a function of time; determining a second edge-weight function for the first system-provided node, where the second edge-weight function gives an edge-weight output value for the second system-provided node as a function of time; and combining the first and second edge-weight functions to obtain a third edge-weight function; and using the third edge-weight function, assigning the first edge-weight value. The method can also include the calculating a first edge-weight value to assign to the first edge includes normalizing the third edge-weight function to obtain a third edge-weight function relative to other nodes in the graph. The first edge-weight value can be for a direction from the first to the second system-provided node, and the first system-provided edge comprises a second edge-weight value for a direction from the second to the first system-provided node. The second edge-weight value can be independent of the first edge-weight value. The second edge-weight value can be different of the first edge-weight value.

In another implementation, the method includes: providing a graph with system-provided nodes, where each node is coupled to other system-provided nodes via one or more edges and each edge comprises a value for a concept category; providing first, second, and third system-provided nodes, where the first system-provided node is associated with a first organization from a first time to a second time, the second system-provided node is associated with the first organization from a third time to a fourth time, and the third system-provided node is associated with the first organization from a fifth time to a sixth time; determining that that second time occurs after the third time so the first and second system-provided nodes association with the first organization have first overlap during the period from the second time to the third time; determining the fifth time is after the second time but before the fourth time so that the first and third system-provided nodes association with the first organization do not overlap, and the second and third system-provided nodes association with the first organization has a second overlap from the fourth time to the fifth time; calculating a first weighting value for a first edge coupling the first and second system-provided nodes in a direction from the first to second nodes; calculating a second weighting for a second edge coupling the first and third system-provided nodes in a direction from the first to third nodes; and adjusting the first and second weighting values so the first weighting value is greater than the second weighting value due to a contribution of the first overlap. The second overlap can occur at a time closer to a time when the adjusting step is performed than the first overlap. The method can also include displaying at a client a page represented by the first system-provided node an index value based, in part, on the first weighting value.

The method can include: calculating a third weighting value for the first edge in a direction from the second to second nodes; calculating a fourth weighting value for a third edge coupling the second and third system-provided nodes in a direction from the second to third nodes; and adjusting the third and fourth weighting values so the fourth weighting value is greater than the third weighting value due to the second overlap occurring more recently than the first overlap.

Other objects, features, and advantages of the invention will become apparent upon consideration of the following detailed description and the accompanying drawings, in which like reference designations represent like features throughout the figures.

BRIEF DESCRIPTION OF THE DRAWINGS

FIG. 10C shows another system flow for calculating an influence index value.

FIG. 10D shows a system flow for using sign posts to determine influence of a node.

DETAILED DESCRIPTION OF THE INVENTION

Figure 1:
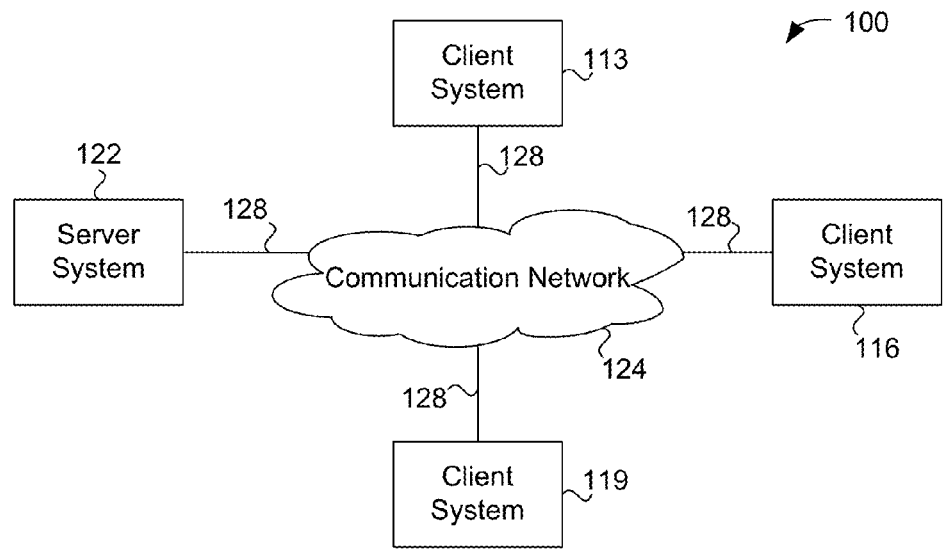
FIG. 1 shows a simplified block diagram of a distributed computer network within which a system of the invention can be implemented.

FIG. 1 shows a simplified block diagram of a distributed computer network 100 incorporating an embodiment of the present invention. Computer network 100 includes a number of client systems 113, 116, and 119, and a server system 122 coupled to a communication network 124 via a number of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like. Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server computer system which provides the information. For this reason, servers typically have more computing and storage capacity than client systems. However, a particular computer system may act as both as a client or a server depending on whether the computer system is requesting or providing information. Additionally, although the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server 122 or may alternatively be delegated to other servers connected to communication network 124.

Client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer browser by Microsoft Corporation, the Firefox® browser by Mozilla Foundation, Chrome by Google Inc., WebKit and its variants, or others.

Figure 2:
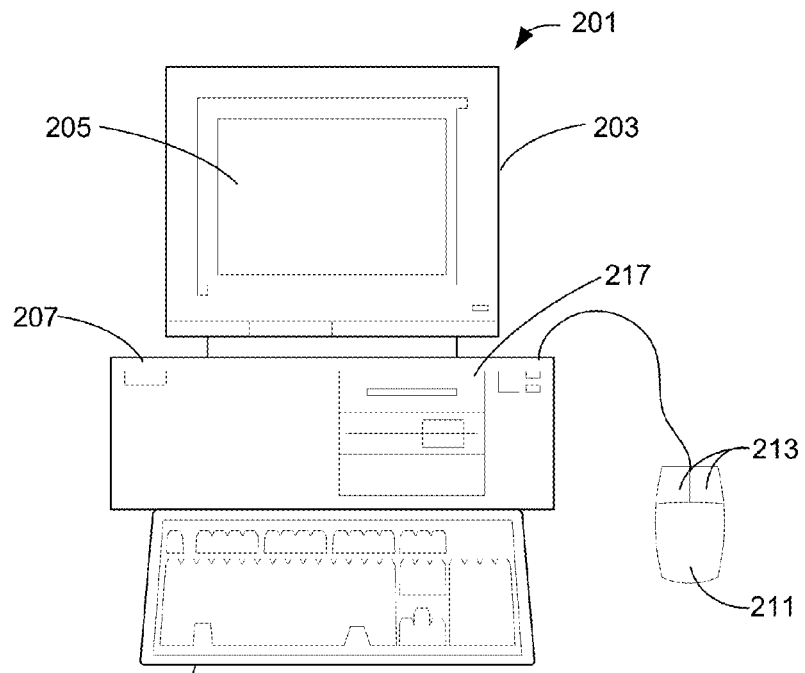
FIG. 2 shows a more detailed diagram of a computer system, client or server, which is used operate with the system.

FIG. 2 shows a more detailed diagram of a computer system which may be a client or server. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like. Mass storage devices 217 may include mass disk drives, floppy disks, Iomega ZIP™ disks, USB removable storage, magnetic disks, fixed disks, hard disks, hard drives including both magnetic and flash storage in a single drive unit, CD-ROMs, recordable CDs, DVDs, DVD-R, DVD-RW, HD-DVD, Blu-ray DVD, flash and other nonvolatile solid-state storage, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

The computer system in FIG. 2 is representative of electronic computing systems with a computer processor or central processing unit (CPU). These include servers, desktop computers, workstations, notebook or laptop computers, tablets, nettops, netbooks, smartphones, set-top boxes, media players, and many others. These can also include iPads, iPhones, PDAs, or Android phones.

Figure 3:
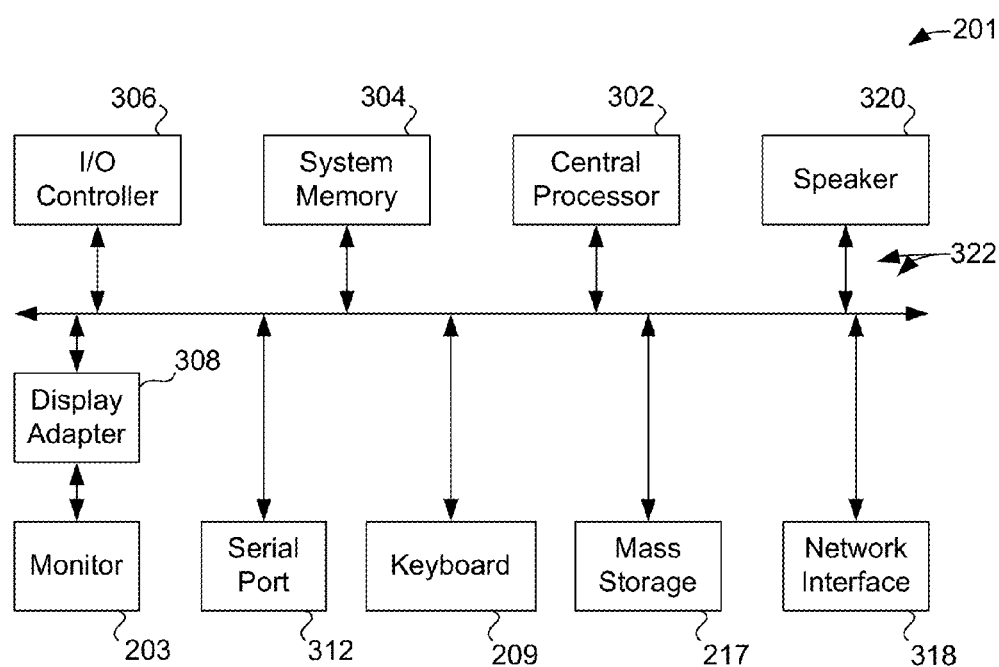
FIG. 3 shows a system block diagram of a computer system used to execute a software implementation of the invention.

FIG. 3 shows a system block diagram of computer system 201 used to execute the software of the present invention. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory. The processor may be a multicore processor, such as the Intel Core 2 Duo, Intel Pentium® D, AMD Athlon™ 64X2 Dual-Core, AMD Phenom™, Microsoft Xbox 360 central processing unit (CPU), and ARM architecture based processors (e.g., Nvida Tegra2, Qualcomm Snapdragon, Apple A4).

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, AJAX, Java, SQL, dBase, Gremlin, Blueprints, Python, PHP, or Closure. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems). An operating system for the system may be one of the Microsoft Windows® family of operating systems (e.g., Windows 95, 98, Me, Windows NT, Windows 2000, Windows XP, Windows Vista, Windows 7, Windows 8, Windows CE), Linux, UNIX, Sun OS, Ubuntu, or Macintosh OS X. Microsoft Windows is a trademark of Microsoft Corporation. Some mobile operating systems that can be used with an implementation of the invention include: Google Android, Chrome OS; Apple iOS4 or iOS5; Blackberry OS; Windows Phone 7.

Furthermore, the computer may be connected to a network and may interface to other computers using this network. For example, each computer in the network may perform part of the task of the many series of circuit simulation steps in parallel. Furthermore, the network may be an intranet, internet, or the Internet, among others. The network may be a wired network (e.g., using copper), telephone network (e.g., public switch telephone network or PSTN), packet network, an optical network (e.g., using optical fiber), or a wireless network, or any combination thereof. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). Other information transmission standards that can be used in a system of the invention include: Bluetooth, wireless USB, WiMAX, EDGE, EV-DO, GPRS, HSPA, LTE, UMTS, Edge, 2G, 4G, LTE. For example, signals from a computer may be transferred, at least in part, wirelessly to components or other computers.

The system maps the world of influence through a large database, which can be stored in a variety of ways. A specific technique is through a combination of an entity graph and associated SQL database, but other database types may be used. The database is at its core a mapping of entities and relationships between those entities. Note that this can be done with an array of other technologies, all of which can be used to achieve the same result. A technique and implementation of the system scales nearly infinitely to handle all the real-world ways that people know each other and facts about them.

The system product allows the paid user or subscriber to step into the created world and see how they fit in. Moreover it provides them with information that allows them to move further in to this world of influence. The system can also be supported, in part or fully, by advertisements.

Note that the system captures certain types of relationship information (and many derivatives thereto) that have never been previously captured electronically. For example, there is no publicly available database in the world that has recorded who someone's best friend is. Or that two people were reported in page six of the news paper as having lunch together. Or what elementary school a particular executive sends his or her children, what grade they are in, what other powerful people have children in the same class, and which parents from that class donated the most money. In an implementation, the system can use the ontology, weighted path algorithms, and centrality algorithm to estimate the probability that two people know each other. The probability function is based on, amongst other things, how much influence these people have over one another, the difference of these two values, the sectors in which these two people have influence, and the influence they have in those sectors. In an implementation, given the default weight of a particular predicate, the probability is one-hundred percent that two people know each other. For example, if the relationship between person A and person B is "mother" the system determines that these two people know each other.

This idea of a person being "powerful" is to be described in more detail (e.g., see quantitative discussion below), but in a simple instance you can say President Barack Obama is the most important person in the world, and thus calculate every single person's importance by how well they know him and how many people removed they are (or how many people they know in common with him and how well). In practicality, several "sign posts" can be erected in each industry that allows for this type of sector power ranking to fall out. Also, this can be cut in a different way to show someone's overall power in the world (for instance).

In an implementation, a sign posts algorithm is used by human operators. These human operators can "bump up" a weight of a particular relationship, or entity in the graph.

In an implementation, the sign posts can alter the distribution of energy/influence in a graph based on a mathematical distribution (e.g., Bayesian distribution, Priors algorithm). Sign posts not only bias the centrality algorithm for influence amongst the entire graph, they can also be applied to effect centrality calculations for a particular domain.

Additionally, by means of the weighted path algorithm, the system can show how influential someone is over an organization, creative work, event, or a series of events. The system can calculate the weights between any two nodes in the graph, independent of their type. This can have to do with how closely they are (or have been) affiliated with an organization, but can also be more nuanced. For instance, a person who is very close to three board members (but himself is not a board member) may be (or possibly could be) a key influencer of that organization. Influence is also transitive, for example: (1) CEO X controls Company Y, which in term owns a controlling stake in company Z; (2) X has transitive power over the CEO of company Z; and (3) CEO W controls company X, which in term owns a controlling stake in Company Y. We can determine that CEO of Company Y, CEO Z is very influenced by CEO W.

The system uses technology to collect this data, including pioneering innovative collection techniques (e.g., Internet, crawling, and filtering). Additionally, there can be a large team of people who "clean" this data. Given that the system is serving a very high-end clientele, the service needs to have very clean and precise data, which the human factor helps achieve.

Figure 4:
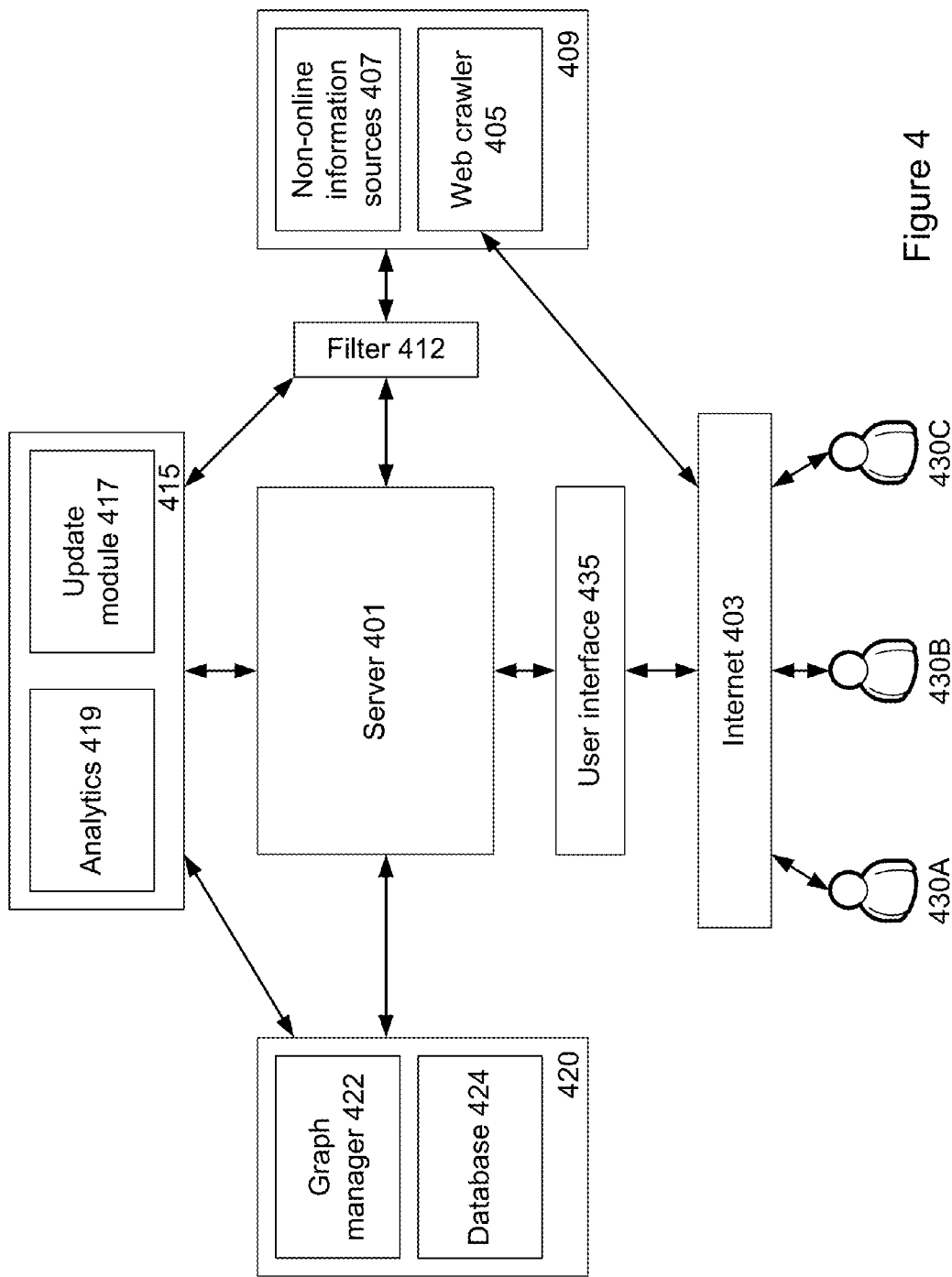
FIG. 4 shows a system diagram.

FIG. 4 shows a block diagram of an implementation of a system of the invention. The system gathers information on entities, people or organizations, from on-line and off-line sources. The information is organized using a social graph (having nodes and edges), so that social relationships between the information can be more easily determined. The system provides this information, organized by social graph, as an information resource service to users. Users can use the system as a tool to identify and make better connections to other people or organizations.

In an implementation, a server 401, having hardware such as described above, executes and stores software and data of the system. The server receives information from an information gathering module 409, which can be take information from on-line or non-on-line (or off-line) sources, or both.

For on-line sources, a crawler module can be used. Via the Internet 403, a crawler module 405 (e.g., Web crawler) gathers information for the system from on-line source and sends the collected information to the server. These on-line sources include Web pages and other unstructured information data sources.

The crawler module is a computer program that browses a network such as the Web or Internet in a methodical, automated manner in orderly fashion to gather desired information. The crawler can be embodied as ants, automatic indexers, Web crawlers, Web spiders, or Web robots. The sites the crawler retrieves information from can include public and closed sources. Some examples of closed sources include membership, closed-networks, and pay information services such as LexisNexis®, which is a registered trademark of LexisNexis.

For off-line sources 407, a research team can find relevant information and then put the information into electronic form for further handling by the system. Such off-line sources can include print (e.g., yellow pages, white pages, school yearbooks, old papers records that have not been put into electronic form) and other sources which are not available on-line. Some of these sources may be newspapers from countries other than the U.S. that do not have an on-line counterpart. Therefore, some of these sources may not be in English, and will be translated as needed (either by a translator (person) or by way of a machine translation) into English for inclusion into the system.

In an implementation, the information gathered (whether on-line or not on-line) is related to an entity, specific person or organization. The person or organization is one that the system tracks for its users. For example, the information may include all activities and news related to the specific person being tracked. These may include news about the person, stock purchases and sales, appearances as events, relationships with others, lawsuits, travel, identification of family members, new family members, contributions or donations to organizations, promotions, demotions, company changes, retirement, and others.

This information from information gathering module 409 is filtered by a filter module 412. The filter module 412 "cleans" the information by identifying the information relevant to the system, and discarding (e.g., removing or redacting) information that is not relevant or is of low relevance to the system. The filtering module may present a report of the proposed filtering to a person for approval or modification before being published live on the system.

After filtering, the information is transferred to an information processing block 415, which includes an update module 417 and analytics module 419. Update module 417 handles determining whether information in the system should be updated, since some of the information may be duplicative or not current. For information to be added to the system, the update module will handle performing updates (or request another module to do the update).

In the case the information is for a person already having a node in the social graph managed by the system, that node is updated. This node is a system-provided node because it is generated by the system, and not one which was created for or by a user or member of the system.

In the case the information is for a person that does not yet have a node, the update module will create the node (as a system-provided node) and create edges for the node as appropriate to link the new node to other system-provided nodes. Edges created by the system between the system-provided nodes are referred to as system-created edges.

Typically, the crawler module continually searches on-line sources for new information. It is desirable that an updates occur in real-time or soon as practicable, so that the information service offers timely information for its users or customers (e.g., 430A, 430B, and 430C). For any new information found, the update module updates the social graph of the system.

The analytics module 419 performs analytics on the information of the system, such as calculating influence index values for each node and other metrics based on the social graph. The analytics modules uses algorithms, and the resulting metrics (e.g., influence or power ranking) can be continually update as the nodes are updated. For example, analytics include calculating or updating a influence index value (or power ranking) for a person. Analytics is described further in U.S. provisional patent application 61/507,106, filed Jul. 12, 2011, which is incorporated by reference.

Another feature of the system is to allow users to set-up watches on people being tracked by the system. Then when users log into the system, their home page will show updates and new news on the watched people since they last time they logged in. E-mail or other messages (e.g., SMS) can be sent to the users to alert users of new news for the watched people.

The system stores information, including the social graph, in a storage block 420. This storage block may be implemented using hard drives of the server or across multiple servers (or network-attached storage (NAS) drives). Storage module 420 includes a graph manager 422 and a database 424 module.

The graph manager module manages the social graph of the system, adding, modifying, updating, or deleting information, nodes, and edges of the system. The social graph can be stored in a database structure. Each entry in the database can represent a node and include links, representing edges, to other entries or nodes. Other computer data structures can be used to implement a social graph of the system, including queues, stacks, pointers, arrays, linked lists, singly linked lists, doubly linked lists, and others, in any combination.

As example of graph manager operation, if a graph contains information about a person who is the chief executive officer (CEO) for a company A, but the person has resigned, the graph manager will update the CEO's system provided node to reflect the new information. The relationship of that person with company A may be removed or altered to show that the person is no longer company A's CEO. Also, information that was not previously in a graph can be added. For example, if the person from the previous example resigned from company A to take the CEO position for company B, the graph is updated to reflect this change. The system stores its information in the database, which can be access by the users of the system to see the updates.

The information of the system is provided as a service to users or subscribers 430A, 430B, and 430C. The users can pay a periodic charge (e.g., month, yearly, or other time period). The users can pay per use (e.g., a charge per search). The users can use the system for free, where the system is, e.g., ad supported or supported by revenue from other sources besides user fees. The system can have also have modules (not shown) for generating revenue by any one or combination of these revenue models.

In an implementation, the system has a Web interface so users can access the system via an Web browser at a client device. The client may be a mobile device such as a smartphone or tablet computer. Depending on what type of device the user 430A-430C is using, the user interface module 435 prepares and transmits a version (e.g., HTML or XML) suitable to the user's device. Also, the user interface module 435 prepares and selects what information to present. The system may have other interfaces, which can be used instead of or in combination with the Web interface, such as a dedicated application or app to connect to the service.

As discussed, the system organizes information about people or organizations using a social graph. By organizing information using a social graph, this can make it easier for viewers who access the information to determine the relationships and connections between the people (nodes) in the social graph. Using the social graph structure, a user can determine the degrees of separation between the nodes in the graph. A node can have any number of degrees of separation, one, two, three, four, five, six, seven, eight, nine, ten, or more. Generally, the more degrees of a separation one node is from another, the less strong the relationship is between those two nodes which represent two people. For example, the user can specify in a search term a number of degrees of separation in which to limit the search (e.g., search for two degrees or less) from a particular person, so that less strong connections can be omitted from the search results.

For a social graph, one degree of separation between two nodes means that the two nodes are connected via a single edge. Two degrees of separation between two nodes means that the two nodes are connected via two edges (passing through another node). Three degrees of separation between two nodes means that the two nodes are connected via three edges (passing through two other node). Therefore, n degrees of separation between two nodes means that the two nodes are connected via n edges (passing through n−1 other nodes).

Compared to, e.g., an HTML page or other data structure giving information on an individual, the social graph structure gives additional relationship information, which is very valuable in the context of a person trying to make relationship connections. With a social graph structure, an information page for a person of interest (person A), the user can see the people connected by a first-degree connection to person A. The person can connect via a link on person A's page to see another person, person B, who has a one-degree connection to person A. On the page for person B, the user will see all the one-degree connected people to person B, which includes person A.

With an HTML page, the relationship information is not inherent in the HTML structure. In fact, once one follows a link from one HTML page to another, the next HTML does not necessarily include a link back to the referring page. Information is lost when traversing from page to page. A social graph structure does not have this problem.

Although there can be any number of degrees of separation in a social graph, the system can allow the user to configure searches, calculations, and other operations to limit the numbers of degree of separate to a certain value m, an integer 1 or greater. By limiting the m, this can increase the speed of the system, since less information or nodes need to be considered. The user may want to leverage stronger relationships first, and such a user-configurable setting allows this.

As a further aspect of the system, after a user signs up and becomes a member or customer of the system. The system creates a node for the user, which is a ghost node in the system graph. This is in contrast to a system-provided node which is a node created by the system. Ghost nodes of the system are created for users of the system. Connections between ghost nodes and other nodes (e.g., system-provided nodes) are through ghost edges. A ghost node and its ghost edges is visible only to the user, and not others users of the system.

For the ghost node, the system allows the user to input information on the user. For example, this information can include people the users know, activities the user participates in, education of the user, and others information about the user. This user-input information can help the system identify connections to the system-provided nodes (people being tracked by the system).

The user can then tag people the user knows, organizations the user is affiliated with, and things the user likes. The more relationships the user adds the more they become plugged into the sphere of influence. Given the information provided by the user, the application runs weighted path algorithms in order to show the user to whom they are connected and how.

The system does not allow the activity of this ghost node to effect the way information is generated for other users. Since the information added by the user is applicable to that one person, this node is treated as a "ghost node." Any calculation that hits this part of the graph for any other user, realizes this is a ghost node, and the traversing at that part of the graph dies.

So, the system allows a person to enter ("virtually") into the graph for the user's own use, morphing and defining it for the user's own purpose without impacting other users, or the general makeup of the system's data. The ghost node will not interact or interfere with other ghost nodes for other users of the system.

Figure 5:
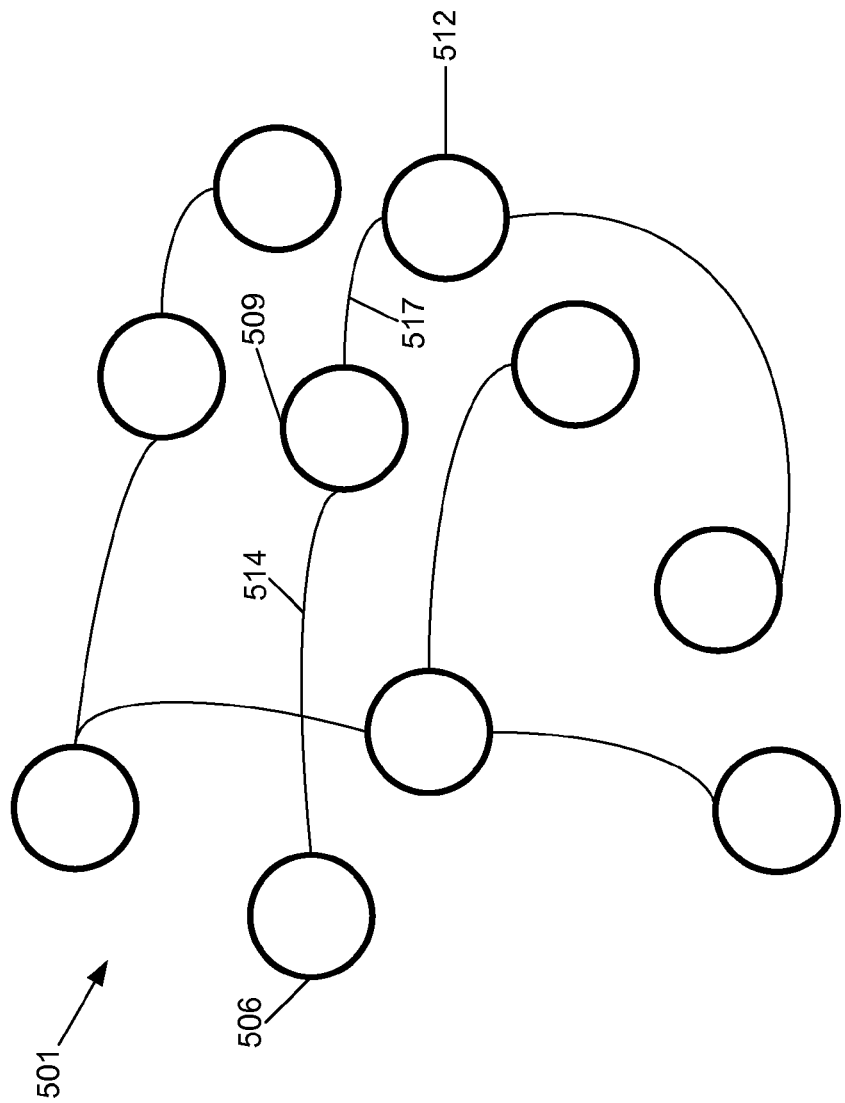
FIG. 5 shows a social graph with system-provided nodes connected by system-provided edges.

FIGS. 5-9A show a sample social graph of information for a system of the invention. FIG. 5 shows a sample master graph 501. This graph is maintained by graph manager 422 of the system. The nodes or circles (e.g., 506, 509, and 512) represent entities (people or organizations), and an edge or line (e.g., 514 and 517) between two nodes represent a connection between the two entities. In an implementation, the nodes can represent any entity (e.g., organization, people, organizations, creative works, events, products, awards, places, groups).

Nodes 506, 509, and 512 are system-provided nodes. Node 506 has a one-degree connection through edge 514 to node 509. Node 506 has a two-degree connection through edges 514 and 517 to node 512. Node 509 has one-degree connections to both nodes 506 and 512, through edges 514 and 517.

Figure 6:
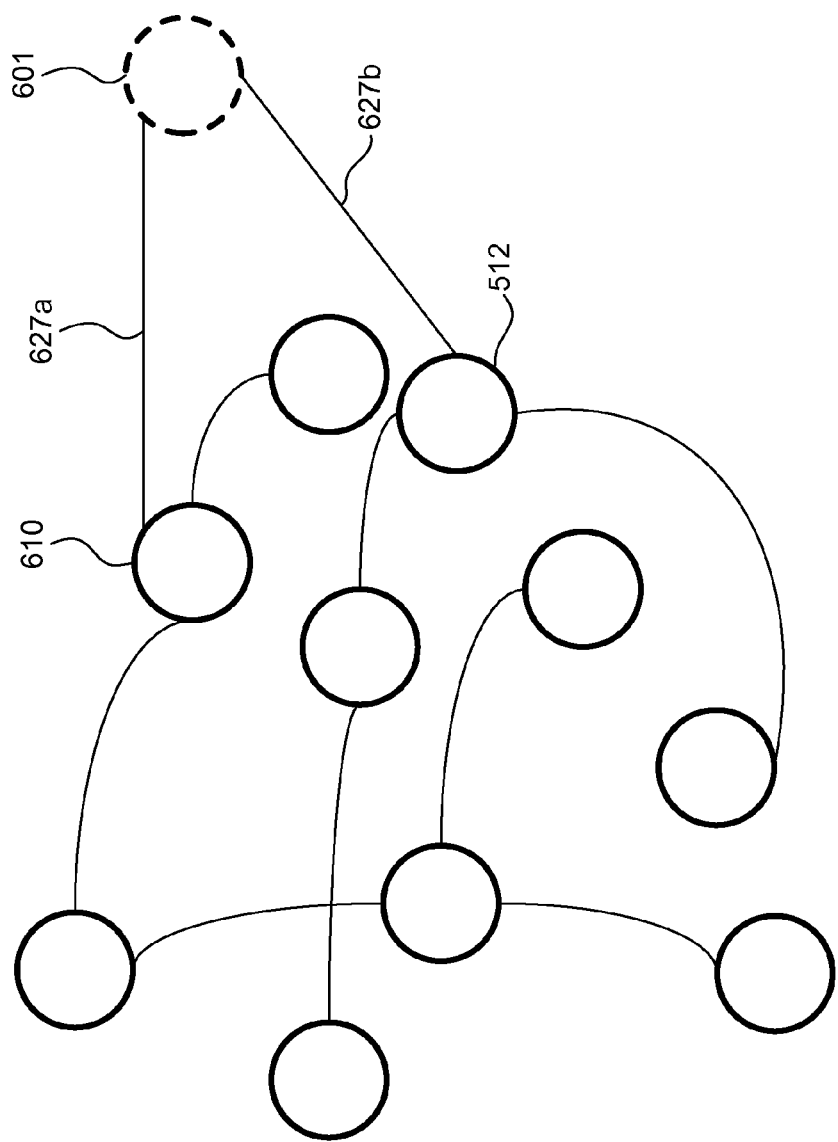
FIG. 6 shows the addition of a first user as a ghost node with ghost edges to the social graph.

FIG. 6 shows a first user being added as a ghost node 601 to graph 501. Node 601 is shown in broken lines. This first user 601 can be representative of a subscriber (e.g., ghost node) in the system, while the other nodes in solid lines are representative of a system-provided person or entity. The first user 601 adds information on connections they have in the system. For example, the first user in FIG. 6 is associated or affiliated with two persons 610 and 512 in the master graph, as represented by the two ghost edges 627a and 627b.

Figure 7:
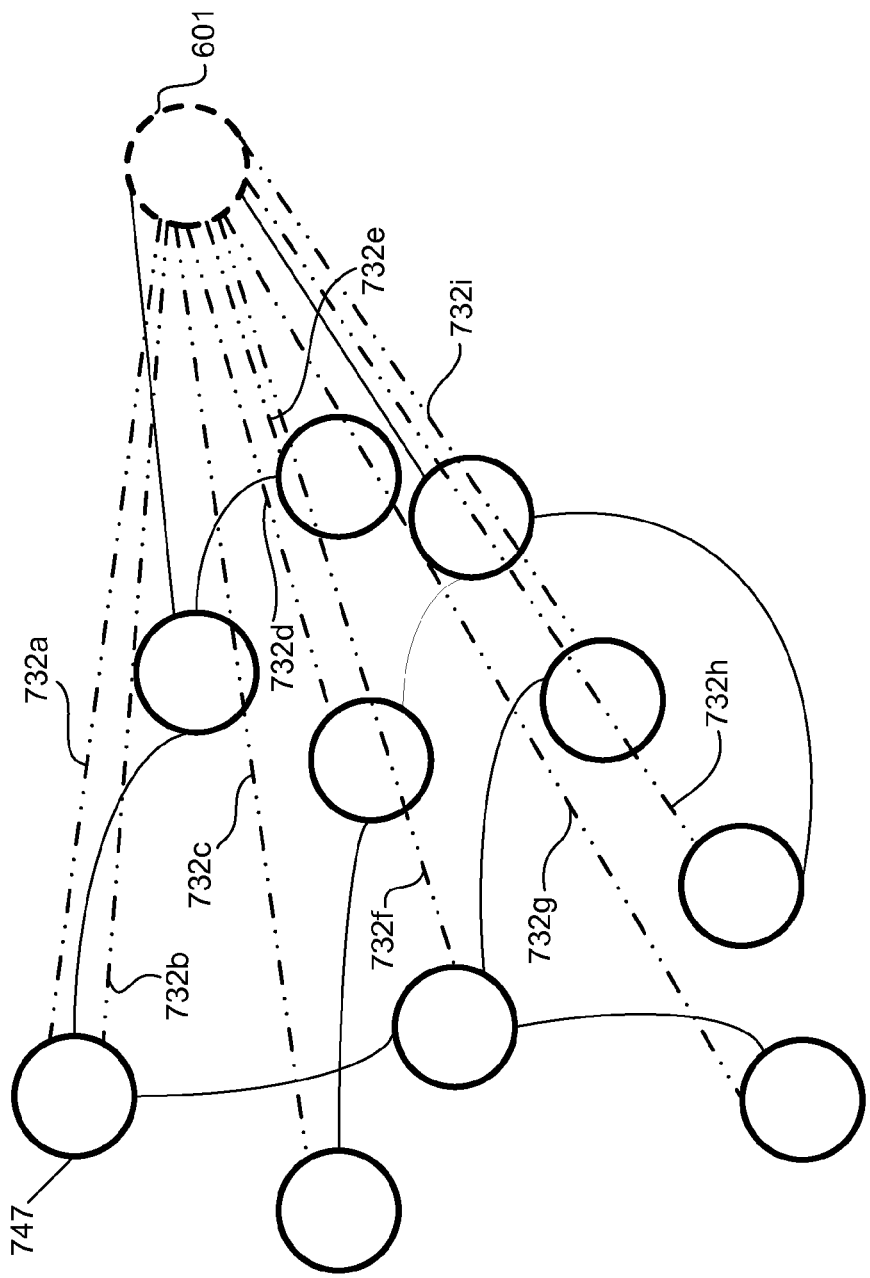
FIG. 7 shows connections the first user can make to system-provided nodes of the social graph.

FIG. 7 shows relationships ghost node 601 has with other nodes of graph 501. Node 601 has first-degree connections to nodes 610 and 512 (see FIG. 6). The relationships are represented by connections 732a-732i (not shown in FIG. 6) are of varying degrees of separation, greater than one. Node 601 has n degrees of separation with these nodes, where n is a number of edges (ghost edges and system-provided edges) that exist between the nodes to be traversed. For example, node 601 has a two-degree connection to a system-provided node 747, passing through one ghost edge and one system-provided edge.

Greater than one-degree connections are the connections that the first user does not have directly (e.g., first degree of separation or one step), but has through additional people or nodes. With the information in social graph from, the first user can trace how this connection or route is established.

Figure 8:
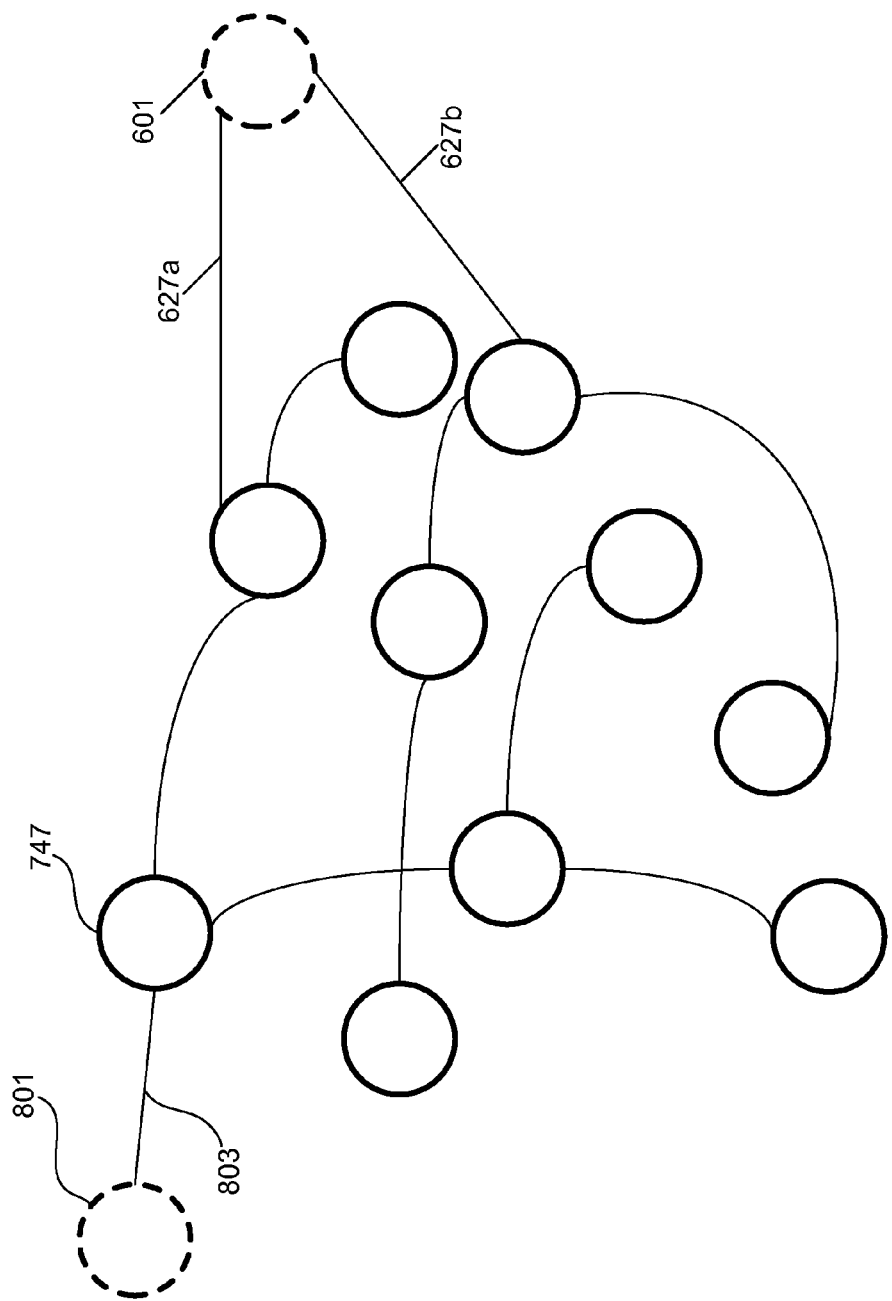
FIG. 8 shows the addition of a second user as another ghost node with a ghost edge to the social graph.

FIG. 8 shows a ghost node 801 for a second user 801 being added to graph 501. Node 801 is shown in broken lines. This second user has a single connection through a ghost edge 803 to node 747. The second user is able to see the connections in the curated system, but will not be able to traverse through a ghost edge or ghost node, or to see information on any other ghost nodes or ghost edges. In particular, node 601 and edge 627a and 627b will not be visible or accessible to the second user.

Figure 9A:
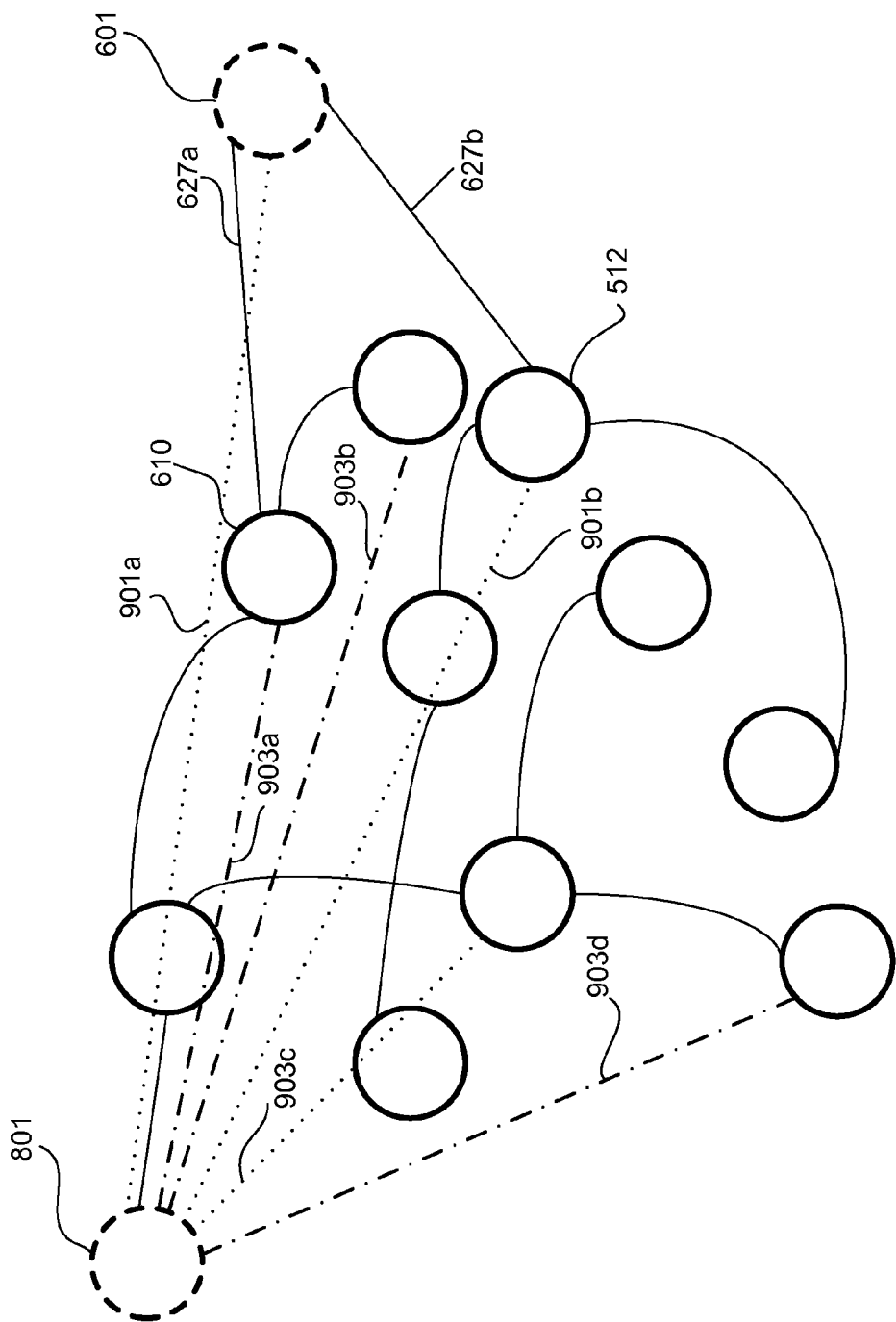
FIG. 9A shows connections the second user can make to system-provided nodes of the social nodes, and the first user's ghost node and edges are not available to the second user.

FIG. 9A shows a connection 901a between node 601 and node 801, as well as a connection 901b from node 801 to node 512. Connections 901a and 901b are shown using a dotted line. The second user 801 is connected to various nodes that are two or more degrees of separation away from the second node 801 by edges 903a, 903b, 903c, and 903d. System provided nodes may be connected via ghost nodes and ghost edges. In this figure, nodes 610 and 512 are connected by ghost node 601.

However, in an implementation of a system of the invention, users of the system (e.g., represented by ghost node 801) will not be able to see connections between system-provided nodes (e.g., 610 and 512) that are due to ghost nodes (e.g., 601) and ghost edges (e.g., 627a and 627b) of other users.

Therefore, in the graph this figure, the second user (i.e., node 801) has no connection to system-provided node 610. To reach node 610, the two ghost edges to the first user 601 would need to be traversed, which an implementation of the system does not allow.

In other implementations, a ghost node (e.g., super ghost node) can make traversals through other ghost edges and ghost nodes to make a connection to other system-provided nodes. This can occur when two users share contacts and connections between each other. So, in this example, when first user 601 and second user 801 share connections (or part of the same entity or company), both gain additional connections (e.g., n-degree, n-step connections). For example, the second user gains a connection to node 610 through the route 901a to 627a.

In an implementation, the system can have a limit for a number of degrees (i.e., d) for displaying or considering connections. As discuss, as the number of degrees increases, the strength of the connection or relationship between two nodes diminishes. Also, processing power by the system increases as d increases since many more nodes and edges are to be considered. Therefore, the limit for the number of degrees, d, can be system defined or user defined (discussed above). For example, d can be 2, 3, 4, 5, 6, 7, 8, 9, or another integer. Then, when requested to show the list of connected nodes, the report listing will show nodes restricted to within the degrees of separation as specified by the d value.

In an implementation, the graph database of the system has nodes (representing entities) and edges (representing relationships). The entities and relationships can have any number of properties. Each property for a particular entity or relationship, also has a value. Additionally the edges are directional, so that each edge implies an incoming and an outgoing node. The relationship one node has over another is different can have different meaning, but the one relationship is represented as one explicit fact. Nodes (or vertices) and edges also have weights (or rankings) that is determined by the type or category.

Some specific flows for determining a technique of the invention are presented below, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

In an implementation, every piece of information is attributed with a "type." The type system is our ontology as information is broken down into a few major categories that organize different types of data. Entity Types classify each entity, or node in the graph at the top level. In an implementation, entity types include: People, Organizations, Creative Works, Events, Products, Awards, Places, and Transactions. Each Entity in the system can be categorized at very granular levels, and have multiple classifications, however, each entity must have exactly one top level type. Further information on these entity types follow:

(1) People. These are the natural persons in the system. Many of the other entities relate to one or more people in the system.

(2) Organization. For example, these are companies, non-profits, associations, fraternities, or others.

(3) Events. The system can track event such as business transactions, conferences, parties, award ceremonies, or others. These events can have influential or important persons in attendance.

(4) Creative Works. Creative works are films, TV shows, paintings, books, or others. These entities are important because they create additional connections between entities.

(5) Awards. Awards can be creative work awards, ranked lists, hall of fame memberships, Honorary Degrees, or others. Awards can be given to people, organizations, and creative works. These are usually given (or granted) by an organization.

(6) Products. Products are produced by companies. Products can be dealt with both on an abstract level (where one entity represents the product), or on a per instance level. Stocks issued by a company, both public and private types of stock, are dealt with as products.

(7) Places. Places are a special type of entity in that these entities must be defined in geo-spatial terms. Places can be both administrative regions (e.g., cities, states, countries) as well as points or physical places (e.g., restaurants, museums, offices)

(8) Transactions. Transactions are ownership events that involve two or more companies, and any number of people.

In an implementation, an organization is a collection of multiple people. These people can be also be represented as nodes, separate from the organization. For example, company A has a CEO who is person B. Company A can be represented as a company node, while person B can be represented as a person node. Person B will also be connected to company A. A benefit of using organizations is that it helps the system arrange its data and possibly decrease the amount of nodes in the system. For example, some organization can have many members or people. Using the example given previously, if there is a person C who is an entry-level associate at company A, the system does not need to create a person node to represent them. Instead, person C can be associated with the organization without a separate person node. This simplifies and reduces the information the system needs to store. Also, grouping by organizations assists a user of the system in making searches by allowing powerful queries based on an organization. For example, the system can tell a user not only who is in an organization, but whether another person is associated with the organization. For example, for a popular golf club (an organization), the user can find out not only who is a member of the club, but others associated with the club (e.g., people who make donations to the club, is a spouse of a member of the club). This allows the user to quickly expand their connections, by asking who is connected to an organization.

In an implementation, each entity can have [n] number of classifications. Entity classifications describe and categorize entities at a granular level. For example, Bill Gates is an {Entrepreneur}, {Technologist} and {Philanthropist}. Entity classifications are stored in a tree structure, the root of the tree converges at the master entity types, as discussed above.

In an implementation, a 0-1 Score of a particular entity's influence over another is calculated on the fly with our weighted path algorithm, as discussed in further detail below. This score may be the result of a function based on: (1) Predicate (Type of Relationship); (2) Time (e.g., Recency, Length of time); (3) Amount of Incoming links of the same predicate, or (4) An array of Attribute value pairs are based on the system's ontology and can modify the weight-in/weight-out of the edge. This includes all of the paths throughout the graph that link those two entities together.

In another implementation, the ontology of the system is represented by two separate Ontologies which are referenced throughout the system's data set in a number of concepts. These type systems are, for example, Concepts Graph, and Type System. The Type System is represented by six separate graphs which have different applications and different significance: Entity Classifications, Entity Attributes, Relationship Types (e.g., Edge Labels), and Relationship Attributes, Entity Attribute Values, Relationship Attribute Values.

Entities are categorized in the "Entity Classifications" partition of the type system. Each value in the entity classification can be linked to any entity in the graph via the "Type Of" Edge. Each vertex in the graph will be linked to at least one classification.

In an implementation, the system links interests as concepts in the concepts ontology. This allows us to connect people having similar interests while not having the exact same interest. For example, we could connect the node for "Biking" to the node of "Running" with a "Related Interest" edge.

In an implementation, the direction of a particular relationship type or edge label is defined in the "Relationship Types" system. A directed edge has a name and an inverse name, and different values for the default in/out weights. A bi directional edge has a NULL inverse name and has the same value for weight-in/weight-out. Some relationships, such as a friendship, has no direction, since there are no inverses. A direction is useful for representing other relationships, such as a father or employee, since directed relationships have are inverses. A fixed weight is used to calculate all relationships of a specific type. A fixed weight is associated with the inverse relationship (if is directed).

In an implementation, influence is determined in two ways by two master algorithms. These algorithms determine the influence that two entities in the graph have over each other and one entity's influence in the world. This includes:

1. A person's influence in the world (their centrality in the graph).

2. A person's influence over a particular person.

3. A person's influence in a particular sector.

4. A person's influence over other types of entities (e.g., person, organization, creative work, field of study).

5. A person's influence over a concept (e.g., the most influential people in Mathematics).

In an implementation, a centrality algorithm is used. The centrality algorithm determines a person's overall influence in the world, which is a function of their influence over the people they know, and how powerful those people are. The more powerful people (quantity and quality) you know (the better), the more powerful you are. The more powerful those people are, the more powerful you are. The more powerful people the user knows, the more powerful those people are, and the closer the user knows those people, the more powerful you are.

In yet another implementation, the centrality algorithm uses sign posts. This is a sort of bias on the centrality algorithm to operate with the assumption that this entity has a higher or lower weight then it would usually have if the algorithm were to be run with no bias. When the weight of one entity starts off with a bias, it effects the weights of all other entities and ripples through the entire graph. In order to ground the weighting mechanism of the system, and to get started in calculating influence, the system uses some Educated guesses (e.g., initial values) for some people. Having that weight allows us to calculate the weights of the entities surrounding them in the graph. Sign posts are not only used to bias the overall influence on one person in the master graph, they can also be used to bias their influence in a sector (or concept). In an implementation, sign posts are used in a concept by attaching edges from relevant nodes to a concept node. A bias can be applied to a node connected to the concept. Once the bias is applied, the effects of the bias can propagate through to other nodes connected to the concept (e.g., adding weights to edges connected to the concept).

For example, providing President Barack Obama an influence of 1.0. It is fair to say that anyone who has influence over President Obama, has influence in the world. Since we know this weight, we can start to calculate the influence of the people that surround him and others by how closely they are associated with him. See further discussion of signposts elsewhere in the application.

The system calculates the distribution of energy (or weight) in the graph but instead of having each node start with the same value, the system staggers it by hard coding influence metrics for a particular set of entities. This allows the function to feed off of itself.

In an implementation, weighted path algorithms are used to determine influence. For example, person-to-person influence can be determined according to: a particular relationship type (a predefined constant); the amount of direct and indirect relationships between two nodes; the influence of those incoming and outgoing links and time (duration and recency). In a simple form of the weighted path algorithm, two people who are on the subcommittees of the board for two public companies boards (e.g., small groups that are important and meet often) for the last five years (such that they have many meetings and discussions over time) have a stronger relationship that two people that were on a large (50 person) nonprofit board 10 years ago.

In yet another implementation, a person's influence over a non person entity can be determined. This non-person entity can vary from a company to a film. Influence is calculated per instance based on, for example, relationship type (e.g., Board Member), time, size of company, or others with influence. Additionally, there is the concept of influence over others with influence over the organization).

In an implementation to gather overall influence of a person, the summation (a simplified version of the function used as an example) of the relationship instances or paths between two nodes is calculated. Meaning if someone is the founder, and the CEO, those two different relationships have different weights independently. The summation of these two relationships, or edges, gives us the overall influence that one entity has over another.

In an implementation, an entity can have pass through (or indirect) influence to another entity. An example is that a person who has influence over Obama means that person is influential in the world. Another example is a private equity executive's influence over one of the firm's portfolio companies. In a specific example, Phoebe Phillips is the CEO of Hoode Partners she has a certain Influence over the firm. Since Hoode Partners owns a portion of CeeCee's Shoes Hoode Partners has influence over CeeCee's Shoes as well as the CEO of the company. This means that Phoebe Phillips has some quantifiable influence over CeeCee's Shoes. This is transitive (or pass through) influence.

In another example, consider the following relationships: Dave is Chris' friend and Dave is Chris' boss. Dave has a certain amount of influence over Chris, and Chris has a certain amount of influence over Dave (albeit less). In the first relationship, the relationship has no direction, that is "friend" means the same thing if you where to swap out Dave and Chris in that sentence. In the second relationship, the relationship implies a particular direction. The same predicate (or relationship type) is not the same when the entities are swapped. The system uses the direction of a relationship to derive influence metrics. Other metrics includes size of the group, length, seriousness (board subcommittee for instance), recency, and duration. This can be extended to companies. A CEO has a certain amount of influence over a company, and most certainly the company has influence over him.

In an implementation, the weighted path algorithm calculates the weighted paths between two nodes. Those two nodes could be the combination of any two types of node that exists in the ontology. For example, these can be:

(1) [Person]-to-[Person],
(2) [Person]-to-[Organization],
(3) [Person]-to-[Industry], or
(4) [Person] to [Concept].

In an implementation, one user's node is a ghost to every other node in the system. Thus, a piece of data added by a user will have no relevance to another user. However, for groups of users, say a small venture capital firm, the system allows a group of people to enter their contacts that are shared. This means that instead of just one node being the center of the universe for a user, the group of people in the firm are at the center. The value of the product increases tremendously by this sharing because it allows the users to plug-in to the database with a larger core. By interacting with friends and colleagues the connection possibilities increase dramatically. The application has generated a set of distinct paths for two users, and by sharing contacts, now each user can see, and interact with each other's path to power.

Figure 9B:
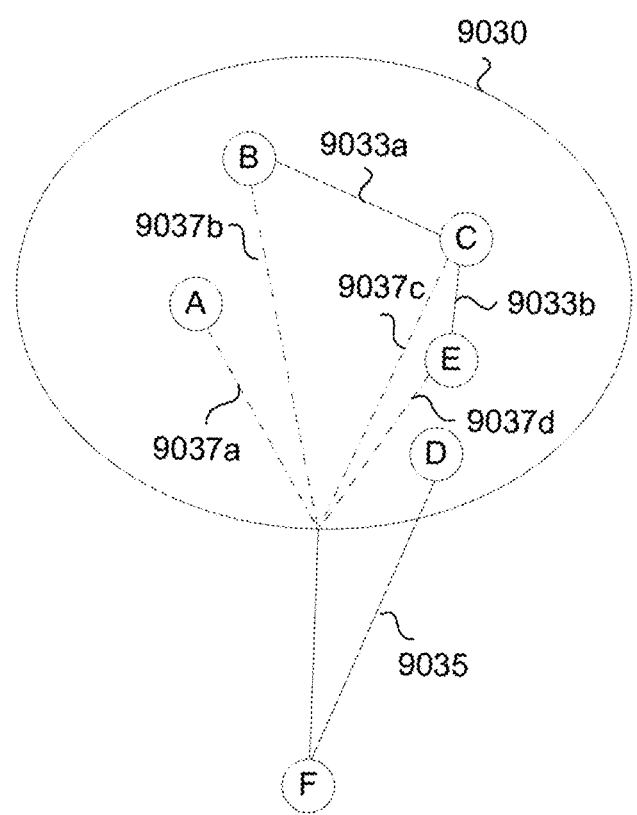
FIG. 9B shows sharing links in an organization.

FIG. 9B shows sharing links in a sample organization (or group). The organization 9030 has members A, B, C, D, and E. In the organization 9030, member C is connected to member B by link 9033*a* and member E by link 9033*b*. Although part of the same organization 9030, member A and D and not connected to the other members of the organization (e.g., B, C, E). However, member D is connected to an entity F by link 9035. This entity F is not a member of the organization 9030. Thus, members A, B, C, and E gain a connection to F by links 9037*a*, 9037*b*, 9037*c*, and 9037*d*. These can be first or second degree connections. For example, link 9037*a* is a first connection from A to F or a second degree connection from A to the organization 9030 to F.

In an implementation, the system can determine a probability that two persons know each other. Even if a person A does not have a direct relationship (e.g., familial, work, social) with person B, other information about person A and B can increase or decrease the likelihood they know each other. For example, if person A and B are active in different fields, such as science and art, the likelihood of the two persons knowing each other is reduced. However, if the two persons both reside in Albany, the likelihood of the persons knowing each other is increased.

In an implementation, some nodes of the system are system-provided nodes. These nodes and their connections are created and updated by the system. Other persons (e.g., users or subscribers) do not create these nodes. In an implementation, administrators of the system update and provide the nodes. These administrators are persons trusted by the system to create and curate the data, so that there is a high level of quality (e.g., accuracy of data, timeliness of data) for information stored in the system. In an implementation, none of the administrators of the system are represented as a system-provided node.

In another implementation, a system-provided node is a node created by a person other than the person represented by the node. For example, if Person A is a person represented by a system-provided node, a person other than Person A creates the node. In another example, where an Organization A is represented by a system-provided node, a person who is not a member of Organization A creates the node.

In an implementation, a person who is represented by a system-provided node is prevented from editing the system-provided node representing themselves. In another implementation, a person who is represented by a system-provided node is allowed to edit a user node representing themselves.

In an implementation, each system-provided node has at least one connection (or edge). For example, each person node will be connected to at least one other node (e.g., another person, organization, entity). This is because system-provided nodes represent persons or entities with influence, and influence is determined in reference to two things (e.g., influence of one person over another person, influence of one person over an organization). So, a system-provided node without any connections would have very low influence, and would not be tracked by the system.

In an implementation, analytics of the system are used on a directed graph structure. The analytics can be based on various algorithms. FIGS. 10A-10D show flow diagrams of a methodology for determining or calculating analytics (e.g., determining influence) for a social graph.

This application incorporates by reference along with all other references cited in U.S. patent application Ser. Nos. 13/224,110, 13/224,117, 13/224,119, and 13/224,149, all filed Sep. 1, 2011.

Figures 10A, 10B:
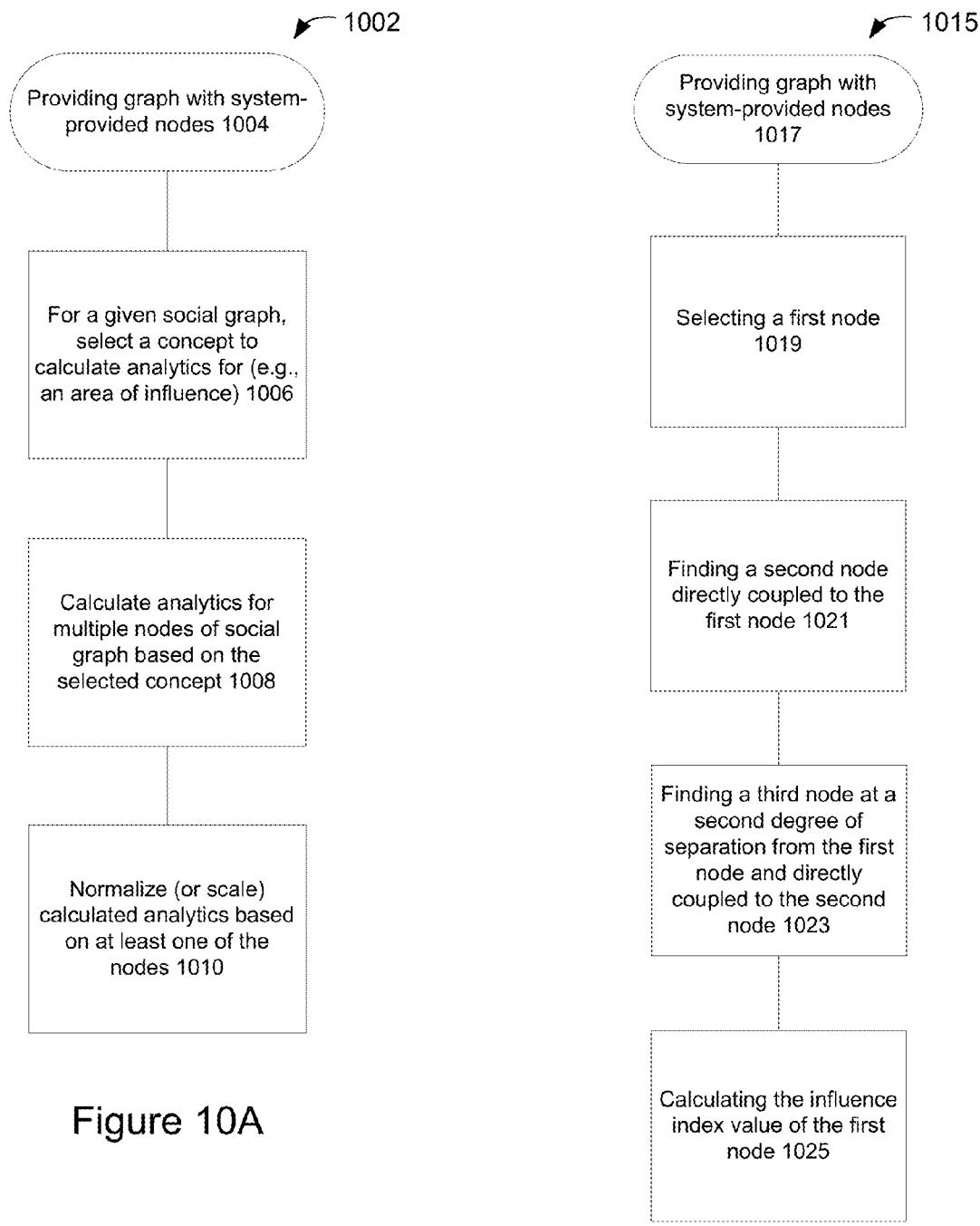
FIG. 10A shows a general system flow.
FIG. 10B shows a system flow for calculating an influence index value.

In FIG. 10A, a flow 1002 provides an overall technique for determining analytics for a system of the invention. In a step 1004, a social graph has system-provided nodes. For this social graph, in a step 1006, a concept (or category) is selected. In a step 1008, the system calculates the analytics of the social graph based on the selected concept. In a step 1010, the analytics are normalized (or scaled) based on the result of at least one of the nodes.

In FIG. 10B, a flow 1015 provides an overall technique for the analytics of the system that can be used with step 1008 of FIG. 10A. In a step 1017, a social graph has system-provided nodes. A first node of the social graph is selected in step 1019. In step 1024, a second node, directly connected to the first node, is found. Then, in step 1023 a third node that is at a second degree of separation from the first node and directly coupled to the second node is found. In an implementation, this second node is not directly coupled to the first node. In step 1025, the influence index value of the first node's influence in the selected concept node is determined.

In FIG. 10C, a flow 1030 provides a more detailed implementation of the analytics of the system. In a step 1032, a social graph has system-provided nodes. The system starts at a first system-provided node based on a selected concept in step 1034. Using the first node, the system finds a second node that has a first degree connection with the first node in step 1036. If no node is found, then the calculation of the influence index value for the first node does not need to traverse anymore nodes in this path step 1038. In step 1040, the system makes sure that the edge connecting the first node and the second node are a part of the concept. If the edge is not a part of the concept, the path ends in step 1038. In a step 1042, the edge is a part of the concept, and the weight of the edge from the first node to the third node is included with the influence index value of the first node. Using the second node, the system finds a third node that has a second degree connection with the first node in step 1044. If no node is found, then the calculation of the influence index value for the first node does not need to traverse anymore nodes in this path in step 1038. In step 1046, the system makes sure that the edge connecting the second node and the third node are a part of the concept. If the edge is not a part of the concept, the path ends in step 1038. In a step 1048, the edge is a part of the concept, and is included with the influence index value of the first node. The system can continue adding to paths of the first node by searching for additional nodes at greater degrees of separation from the first node by repeating steps 1036 and 1040 for additional nodes. This activity runs recursively to generate additional paths and increase path lengths in the graph.

In FIG. 10D, a flow 1050 provides a more detailed implementation of the scaling (e.g., by using a signpost) of the system. In a step 1052, a social sub graph has system-provided nodes with influence index values, so that the nodes of the sub graph have influence index values. In a step 1054, the system selects a first node of the sub graph. In a step 1056, the influence index value of the sub graph is modified. In a step 1058, the influence index value of at least one other node of the sub graph is modified based on the first node. In various implementation, some examples of algorithms that can be used in implementations of the system include Priors Algorithm, Breadth-First Search, Dijkstra's algorithm, and other similar algorithms.

In an implementation, the system uses two algorithms. The first algorithm is the weighted path algorithm. This is used to calculate the weight one node has over another node in the graph. The second algorithm is the centrality algorithm. This is used to calculate the Eigen vector of a node in the graph with respect to the entire graph, or in an ontologically defined sub-section of the graph.

In an implementation, the length of the path between two nodes are the degree of separation between the nodes. For example, in a graph where nodes A and B are connected, A and B are connected through a first degree of separation. In a graph where nodes A to B to C are connected, A and B are connected through a first degree of separation, and A and C are connected through a second degree of separation. Although various degrees of separation are discussed, a system of the invention can be implemented allowing any number of degrees of separation, one, two, three, four, five, six, seven, eight, nine, ten, or more. A system implementation has one degree of separation.

In an implementation the system can define the level of depth for a graph traversal in the system. The defined level of a graph traversal can be used in any graph traversal algorithm, and defined as the Depths First Breath Constant or "D." Defining "D" allows the invention to run on a system with a constraint, and without such a constraint, the graph algorithm could run forever.

In an implementation, the system tracks the connectivity between the world's elite. These connections can be through organizations, events, creative works, places, and the like.

Since these are modeled as entities, paths between people of the system can be identified. The system is organized as a directed graph in which entities (e.g., people, organizations, events, places) are nodes (vertices) and their relationships to one another are edges (e.g., lines, connections).

In an implementation, entities and relationships have properties that modify them quantitatively and qualitatively. The definition of entity types, relationship types, entity attributes, and relationship attributes are defined in our ontology. For example, a person A can be connected to a company B. This can represent person A is a shareholder of company B, and holds 2,000 shares of company B common stock. In other implementations, the property an edge can represent that adjust the weight of the edge are: time; contribution amount (e.g., donation amount, investment amount); position of the person at the organization; or degree (e.g., academic degree, degree of relationship away from a user node).

In an implementation, each relationship type is assigned a default weight-out and weight-in. The weight out corresponds to the weight the primary node has on the second node given that relationship type, and the weight in corresponds to how much weight the secondary node has over the second. This can be represented by a number between 0 and 1. In another implementation, this can be represented by another number scale (such as 0 to 100, 1 to 5, or 3 to 7, or others), or by a percentage (from 0 to 100%).

In an implementation, the default values for weight-in and weight-out are modified depending on particular properties of an edge. For example, the weight-out of an edge of type "donated to" would be greater where the amount was $100 k compared to $1000.

In an implementation, weights for relationships vary over time. As time passes, the weight of a relationship can fall as the relationship grows increasingly attenuated. For example, this can occur for a keynote speaker at an organization's event. Near the time the speaker gives their speech, the weight is high but after a period of time, the weight falls. Conversely, as time passes, the weight of a relationship can raise. For example, if two persons are friends, the longer they are friends, the higher the weight of the relationship.

In yet another implementation, weights are determined by a curve. Curves are defined by the default weight of the relationship type, which is always the max value of the curve on the y-axis, the start date and end date of the relationship, and the relationship type. The relationship type defines the contour shape of the curve, and uses the default weight, the start date and end date to generate one curve that plots the weight of one node over another with respect to time.

In an implementation, indirect paths between nodes are not explicitly stored; rather they are generated in the graph by linking together adjacent nodes.

In an implementation, a weighted path algorithm is used to determine the most valuable paths of connectivity between a set of two nodes (e.g., person to person, person to organization, person to place). For example, a common use case of the system is: "Show me the most influential people over Person A." To generate this information to the end user we generate a list of people, each of which has a path weight to the target person between (0,1). The person at the top of this list will be the node in the graph that has the highest weighted path) to the target node and the results will continue in descending order of path weight.

In an implementation of the weighted path algorithm, once a path between two nodes is found, the following function can be used in an implementation for the system to calculate the weight of that path. For example, see function 1 below.

Function 1:

$$\sum_{i=0}^{i \leq |p|} p(w)i \cdot \left(\frac{1}{|p|}\right)^2 \quad \text{Function 1}$$

This function:
(1) Finds the weight of each edge in that path p(w).
(2) Adds all the paths between 0 and the absolute |p|, where |p| is the length of the path.
(3) Divides the result of step (2) by the length of the path (determines an average).
(4) Divides the result by the length of the path again (where the longer the path, the weaker the relationship).

In an implementation, weights are calculated for an array of paths (e.g., weighted path). This allows calculation of the weight of one node over another node with respect to a particular path in the graph. However, two nodes will often have more than one path connecting them. The application programming interface (API) can return a list of all of the direct and indirect paths between two entities.

In an implementation, less than all the paths between two nodes are found. For example, if a path exceeds a threshold length (e.g., five, six, nine, ten, or more), the system will not consider the path between the two nodes. This is because, when the length of the path has exceeded the threshold length, it would become inconsequential mathematically and practically in the system (since the longer the path, the influence will generally decrease). This can be represented by function 2, shown below.

Function 2:

$$\sum_{i=0}^{i \leq |p|} p(w)i \cdot \left(\frac{1}{|p|}\right)^2 \text{ where } |p| \leq D \quad \text{Function 2}$$

In function 2, D represents the maximum number of hops (or length of the path) the system will account for.

Figure 11:
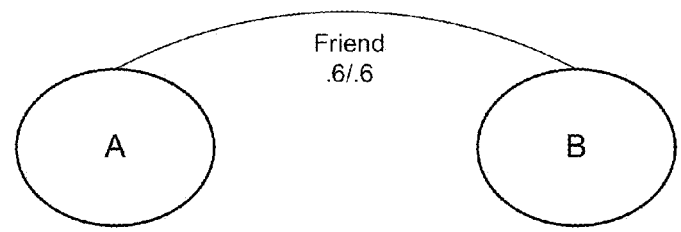
FIG. 11 shows a relationship friend between two nodes.

FIG. 11 shows a relationship friend between two nodes. In the implementation of FIG. 11, the relationship type of friend has a value of 0.6 for its weight in and weight out. Using function 1 given above, this results in a weight-out calculation of 0.6.

Figure 12:
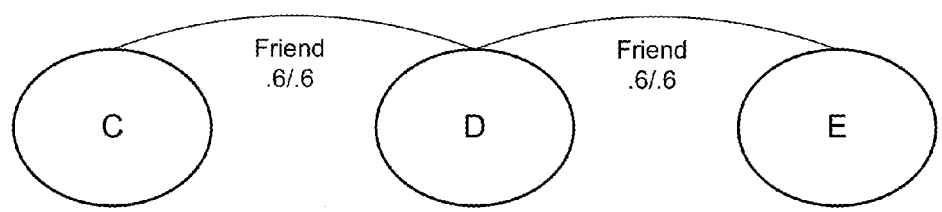
FIG. 12 shows a relationship friend between three nodes.

FIG. 12 shows a relationship friend between three nodes. This is the situation where person C is a friend of person D who is a friend of person E. Using function 1 given above, this results in a weight-out calculation (or influence) of 0.3 from person C to person D.

Figure 13:
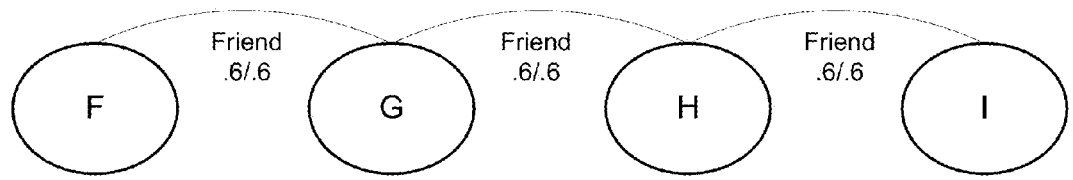
FIG. 13 shows a relationship friend between four nodes.

FIG. 13 shows a relationship friend between four nodes. This is the situation where person F is a friend of person G whom is a friend of person H whom is a friend of person I. Using function 1 given above and a default weight of 0.6 for the "Friend" relationship type, results in a weight-out calculation (or influence) of 0.2 from person F to person I.

In another implementation, multiple paths between two nodes are considered. This can be represented by function 3, shown below.

Function 3:

$$\Phi(p) + \frac{\sum_{i=0}^{i \leq |ps|} Ps(w)i}{|Ps|} [1 - \Phi(p)] \quad \text{Function 3}$$

In function 3, Φ(p) represents the strongest path between two nodes. Function 3 also:

(1) Finds Φ(p) the path of the greatest weight between two nodes.

(2) Finds the sum of all of the other paths between the two nodes.

(3) Finds the average of all of those paths by dividing by the amount of paths.

(4) Finds the difference of the highest weighted path between the two nodes and 1

(5) Multiplies the result of the average of all the other paths by 1−Φ(p), scaling the average of all the paths weights. The result of this will never be greater than 1. The closer the weight is of the strongest relationship is to one, the less the right side of the relationship will affect the overall strength.

This allows the system to consider the importance of particularly strong relationships, even where there are weaker relationships. For example, a person A and a person B are brothers and are also connected by three other paths. Some sample weights can be as follows:

(1) Path_1 (brothers)=0.85
(2) Path_2=0.2
(3) Path_3=0.15
(4) Path_4=0.1

A average of the weight of these paths would be 0.325. The weight of person A and B being brothers is significantly reduced. In the system, using function 3 above, the strongest path would be given more significance in calculating the weight of the relationship between person A and B, and result in a weight of 0.8725 between person A and B.

Figure 14:
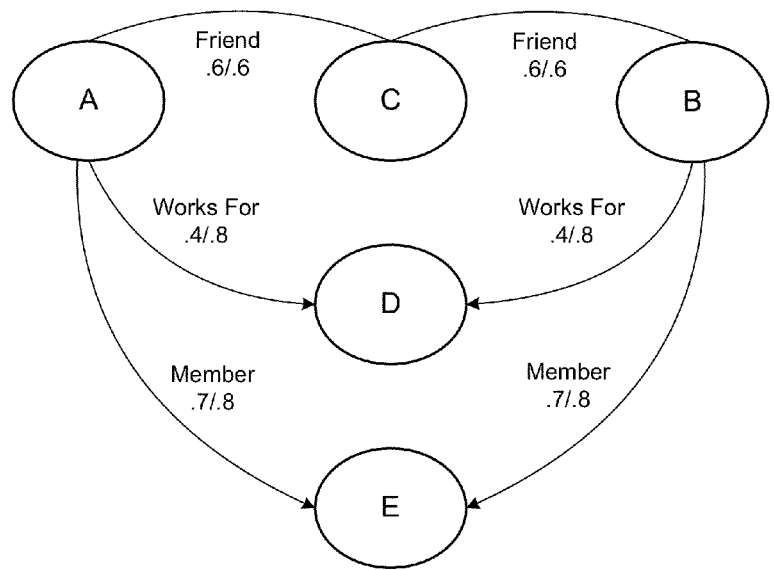
FIG. 14 shows three paths between two nodes (A and B).

FIG. 14 shows three paths between two nodes (A and B). To calculate the influence of A to B, the following steps are performed:

(1) Find the weights of all the paths from A to B. (the weight from A-C-B is 0.3; the weight from A-D-B is 0.3; the weight from A-E-B is 0.375).

(2) Find the value of the strongest path (path A-E-B is 0.375]).

(3) Find the average weights of all paths, not including the strongest path [0.3].

(4) Scale the average of the other paths by 1 minus strongest path between the two nodes (0.3*0.625=0.1875).

(5) Add the result of step (4) with the weight of the strongest path (0.5625). This is the level of influence of person A over person B.

Figure 15:
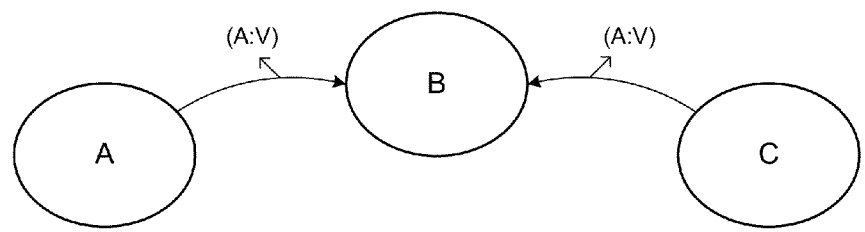
FIG. 15 shows a sample property graph.

In an implementation, the system graph is implemented using a property graph. In the property graph, nodes and edges of the graph can have properties stored as attribute-value pairs. The attribute is the type of property and the value is the corresponding value in the instance of that property corresponding to a node or an edge. In an implementation the values for a property of a given edge (or value of the attribute-value pair) can be updated the weight of an edge based on functions or based on values in the ontology of the system. FIG. 15 shows a sample property graph. These can be referred to as weight modifiers.

Figure 16:
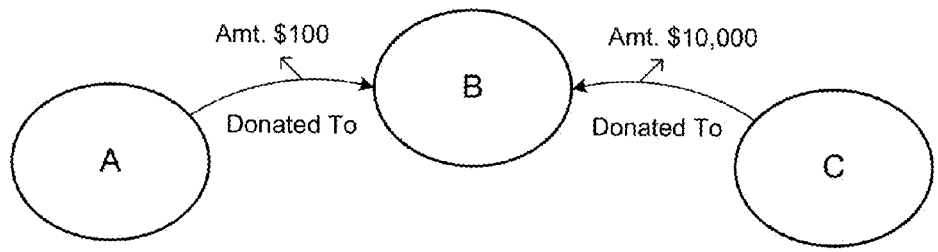
FIG. 16 shows a sample property graph for a donation.

FIG. 16 shows a sample property graph for a donation. Nodes A and C are persons, while node B is an organization. Although both person A and C donated to organization B, since person A donated $100 and person C donated $10,000, the influence of person C over organization B is greater than that of person A. However, the resulting weight that the donations have on organization B is not linear. For example, the influence of person C over organization B is not one-hundred times greater than the influence of person A. The influence is determined logarithmically.

Figure 17:
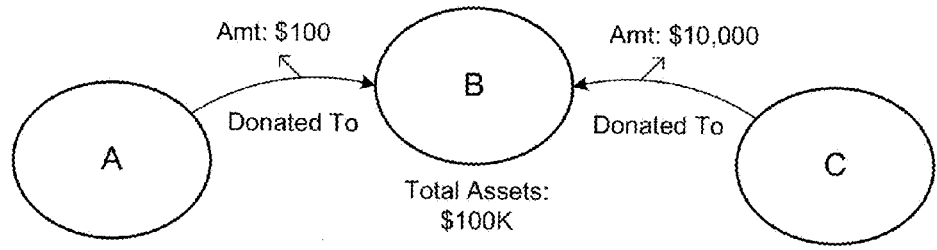
FIG. 17 shows another sample property graph for a donation for an organization with total assets $100K.
Figure 18:
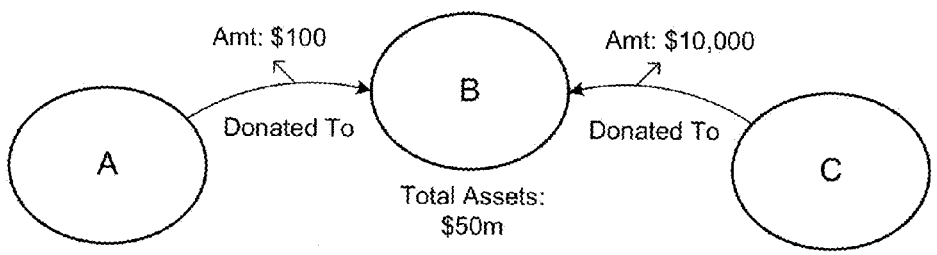
FIG. 18 shows another sample property graph for a donation for an organization with total assets $50 m.

FIGS. 17 and 18 show another sample property graph for a donation. FIG. 17 shows the organization with total assets of $100,000 and FIG. 18 shows the organization with total assets of $50 m. In FIG. 17, where organization B has $100 k in assets, the weight of the relationship between C and B is much more significant than in FIG. 18. The influence that Node A has on Node B does not decrease as sharply as C-B in these two instances. While, A's influence over B is less in FIG. 17 than FIG. 18, the decrease of influence is much less than the influence of C-A. This implies that the donation amount is a weight modifier on a logarithmic scale where the base value is the total assets of the recipient and the variable is the donation amount. This can be represented with the following function, where a is the total assets and b is the donation amount.

$$\log_a b$$ Function 4:

When using function 4, the function will always return a value less than one because, since the amount of a donation can never be higher than the amount of total assets, B will never be greater than A. Because this is true, mathematically, the value must be less than one, which is suitable for the system because edge weights are defined on a scale from 0 to 1. In an implementation, the business rule that "Donation Amount" must not be greater the "Total Assets" is defined in our API.

In an implementation of the system using function 4, the value for A can be other metrics indicative of the size of the non-profit. For example, instead of total assets, the system can use total expenditures or total amount of grants received. Additionally, the system can determine the weights of particular donations as distributions based on the mean or median value of all donations to that organization. Depending on the system's business objective and how influence is defined with respect to a nonprofit, the system can define weights of donation relationships based on different curves other than the log function in function 4.

In an implementation, the function used by the system gives one number as a maximum edge weight, but in order to apply this value to the curve, the defined curve shape of a "Donated To" relationship, is a curve around a point where x is the date of donation and y is the result of the function.

Figure 19:
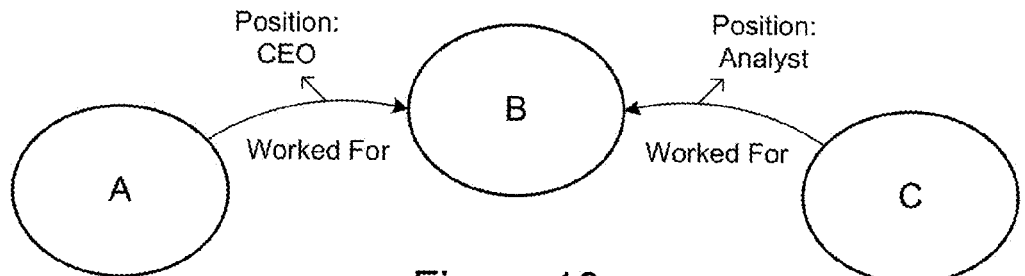
FIG. 19 shows a colleague relationship in a graph.

FIG. 19 shows two "worked for" relationship in a graph. This is used to represent the relationship of an employer and employee. However, some employees have greater influence over a company than others. Being as this is such, the property of "Position" can in an implementation, be used as a weight modifier that sets the default weight of an edge based defined values in the ontology. Some default weights by the position of an employee are shown in a table below. These default weights according to position can replace the default weight provided by the relationship type.

TABLE

Relationship Attribute Values

| ID | RelAttrType | Name | Weight-in | Weight-out |
|---|---|---|---|---|
| 1 | Position | CEO | 0.8 | 0.9 |
| 2 | Position | Analyst | 0.8 | 0.2 |
| 3 | Position | Vice President | 0.8 | 0.6 |
| 4 | Position | Associate | 0.8 | 0.4 |

Figure 20:
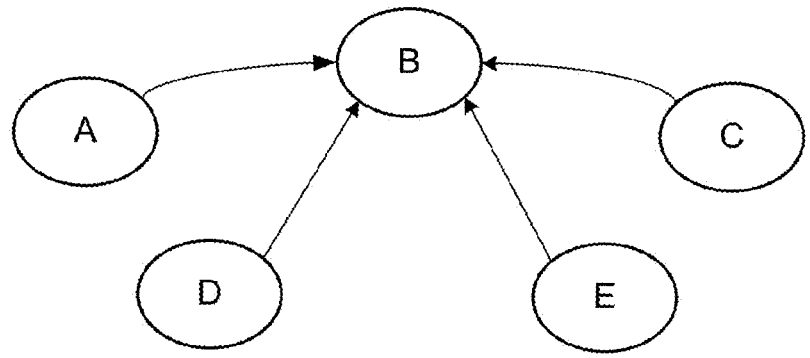
FIG. 20 shows samples of a node with multiple connections.
Figure 21:
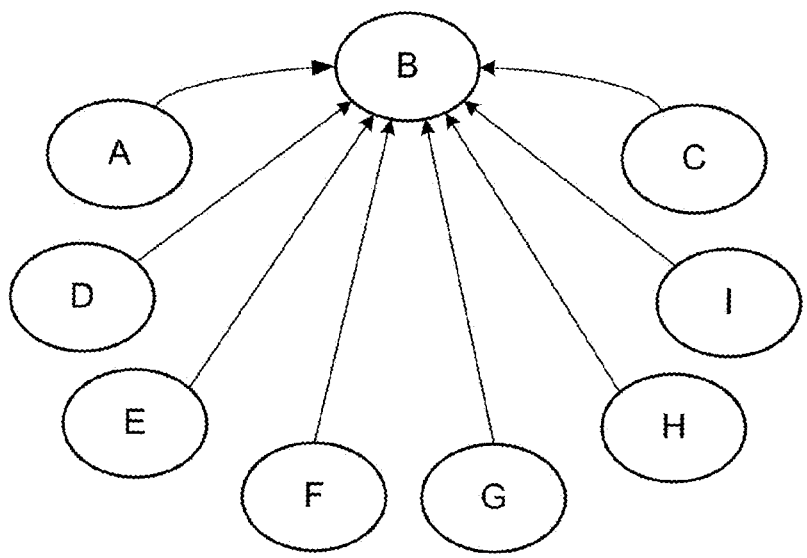
FIG. 21 shows samples of a node with even more connections.

In another implementation, the system can determine the likelihood that two persons know each other. This takes into consideration that two people who work at a small company know each other better than two people at a big company. The system accounts for this by determining when there are more incoming edges to a particular node, the less the weight-out of each of those edges. FIGS. 20-21 show samples of nodes with multiple connections. In FIG. 20, a node B has fewer connections (A, C, D, E) as compared to node B of FIG. 21 which has more connections (A, C, D, E, F, G, H, I). Assuming that all of the edges in FIGS. 20 and 21 are the same weight, the system will infer that node A of FIG. 20 has a higher influence over node B, than in FIG. 21.

In an implementation, the system takes into account time when determining the weight-in and weight-out values between nodes. For example, the CEO of a company thirty years ago, would not have the same influence over the company as a current CEO.

Figure 22:
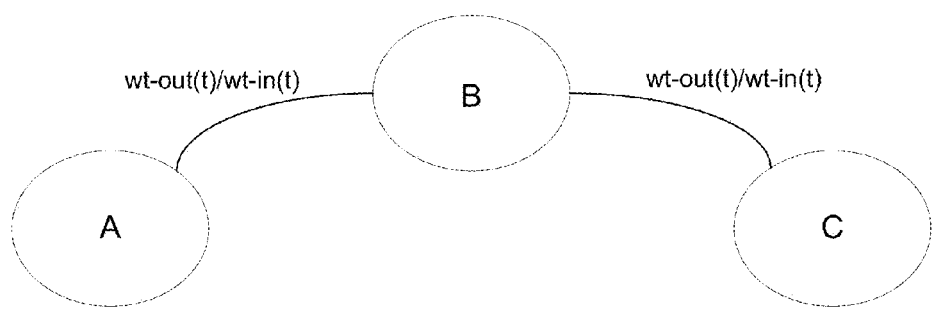
FIG. 22 shows three nodes and their relationship.
Figure 23:
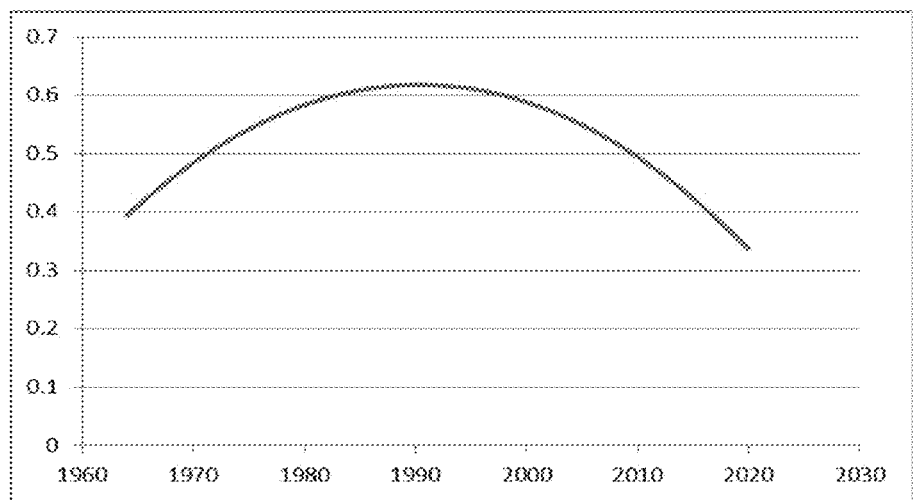
FIG. 23 shows the relationship of the weight of an edge over time and relationship type.

FIG. 22 shows three nodes and their relationship. In an implementation, the weight of the relationships can vary based on: the duration of the relationship, recency of the relationship, and the relationship type. FIG. 23 shows the relationship of the weight of an edge over time and relationship type. Given a start date, end date, and a relationship type of a particular edge, the system can generate a curve where the x-axis is time, and the y-axis is the weight. In an implementation, for a curve corresponding to a relationship, the curve can have a value greater than one even when that relationship did not exist at that point in time. For example, if a CEO took rein of a company at time=x, the curve would peter off towards (y=0, x=0) from that point. At the middle of the relationship, the weight of the relationship is the highest, since at this point the relationship has matured (e.g., a CEO at the height of their time with the company). However, at the end of the relationship, the strength of the relationship has diminished (e.g., a CEO who has left their position).

In an implementation, the system uses a curve dependent on the relationship type, the start date and the end date of the relationship. The curves are generated depending on the weight of the curve, where the default weight value for the weight is the apex of the curve and the predefined contour of the (curve depending on the relationship type) applied to the start date and end date of the curve output a function over time. This can result in a curve that stretches or sinks depending on how the weight of the relationship changes over time. In order to generate the actual curve for the weight of the edge, the system outputs a single variable (time) function based on inputs of start data and end date. Depending on where in the curve a time is, the weight of the edge may be different.

FIGS. 24-28 show curves used in implementations of the invention to determine a weight for a relationship. For example, the x-axis represents time and the y-axis represents the weight of the relationship. Other relationships in the system can be modeled on different contour shapes, not shown in these figures.

Figure 24:
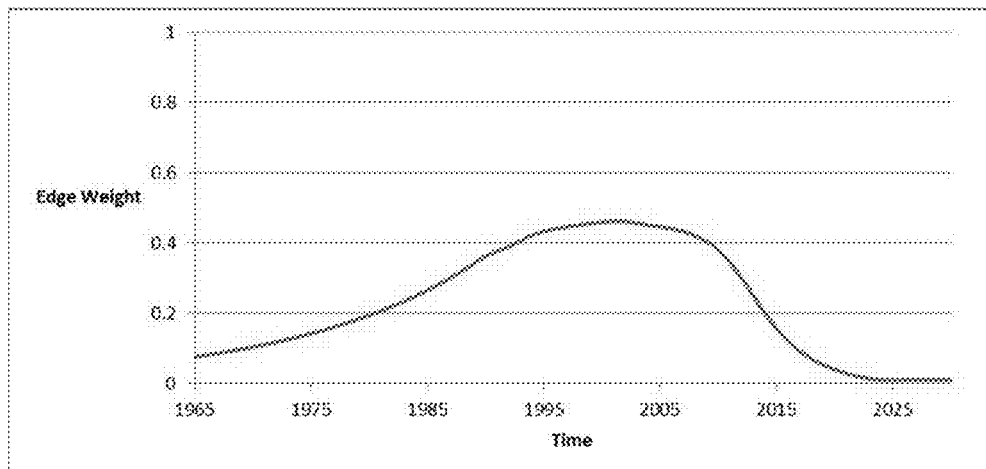
FIG. 24 shows a sample curve where, after a specific time, the weight of the relationship decreases sharply.

FIG. 24 shows a sample curve where, after a specific time, the weight of the relationship decreases sharply. This curve can be used for the "worked for" relationship where a person's power over the company in reality decreases abruptly after they leave their position.

Figure 25:
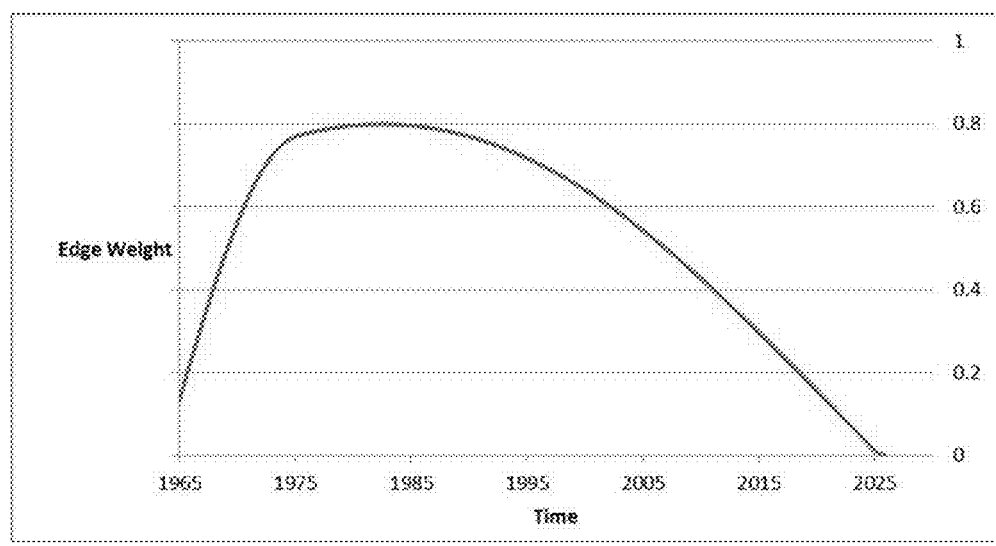
FIG. 25 shows a sample curve where, after a specific time, the weight of the relationship decreases slowly.

FIG. 25 shows a sample curve where, after a specific time, the weight of the relationship decreases but not as sharply as shown in FIG. 24. This curve can be used for the "donated to" relationship where a person makes donations for five years, but does not after the fifth year.

Figure 26:
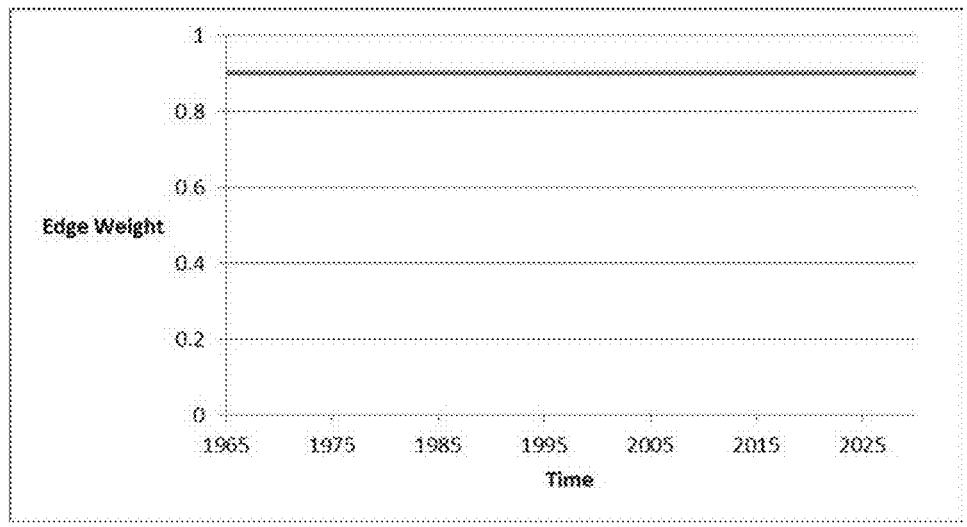
FIG. 26 shows a sample curve of the invention.

FIG. 26 shows a sample curve where the weight of the curve remains constant. This curve can be used for the "Parent Of" relationship where the weight of the relationship does not change over time.

Figure 27:
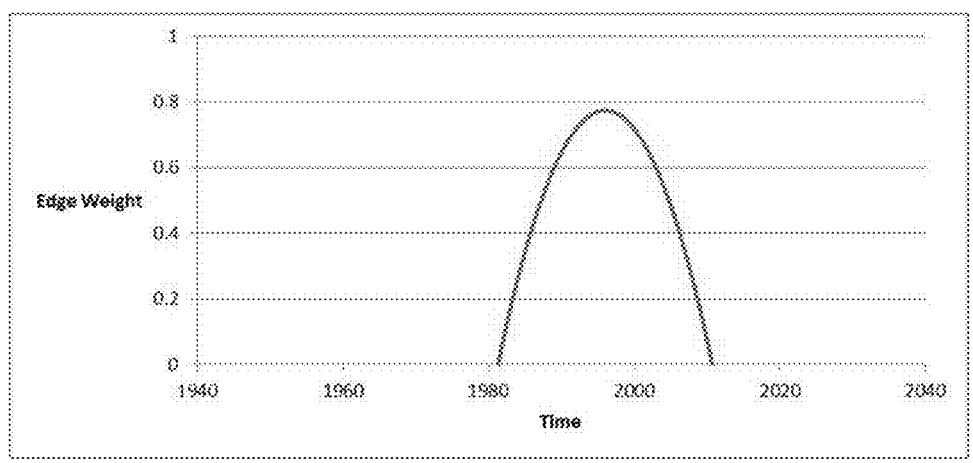
FIG. 27 shows a curve representing a shorter duration relationship.
Figure 28:
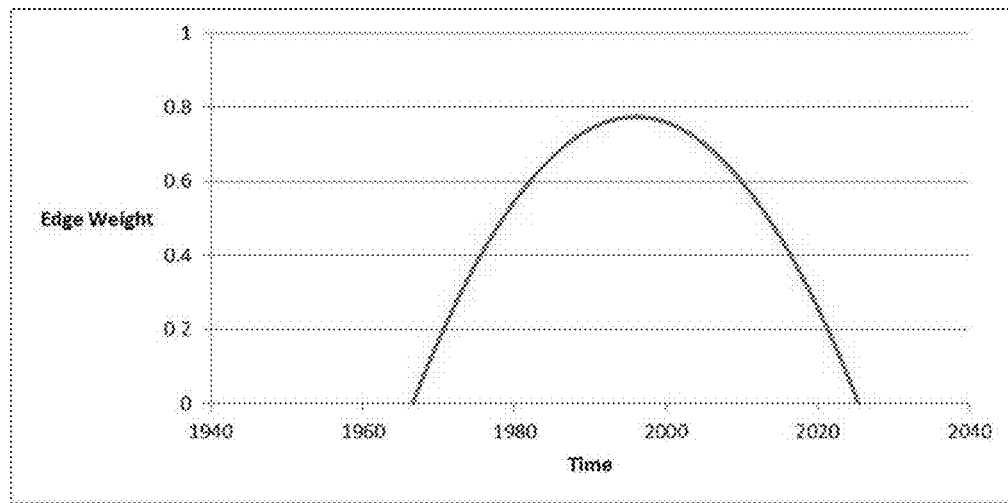
FIG. 28 shows a curve representing a longer duration relationship.
Figure 29:
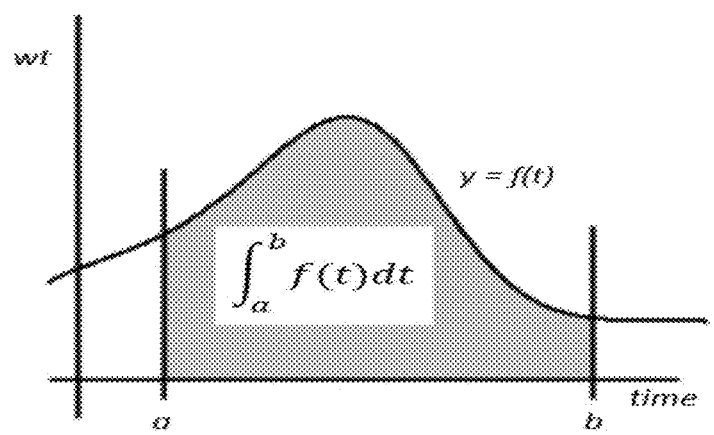
FIG. 29 shows the integration of a curve with system time constraints.
Figure 30:
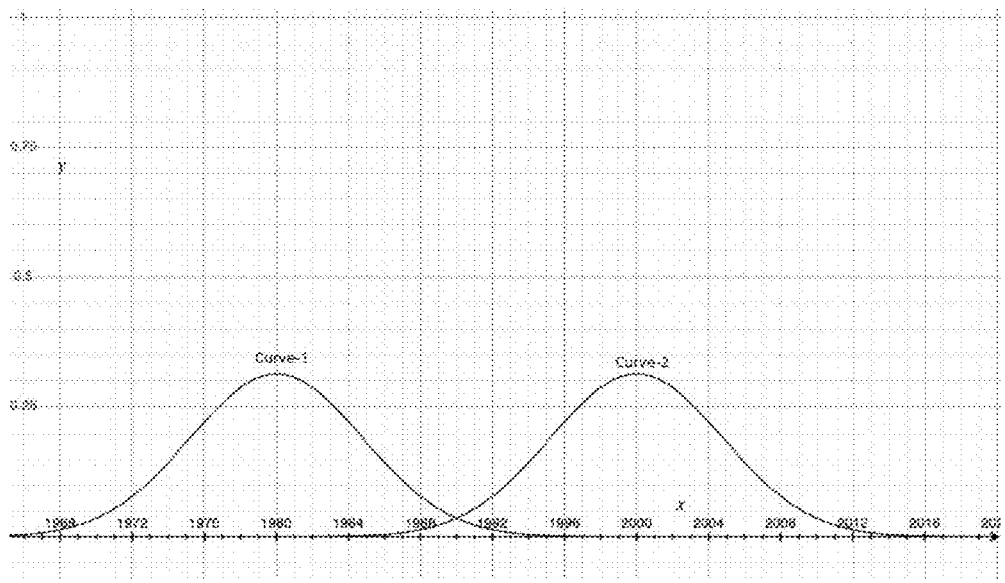
FIG. 30 shows two curves of the same relationship for different time spans
Figure 31:
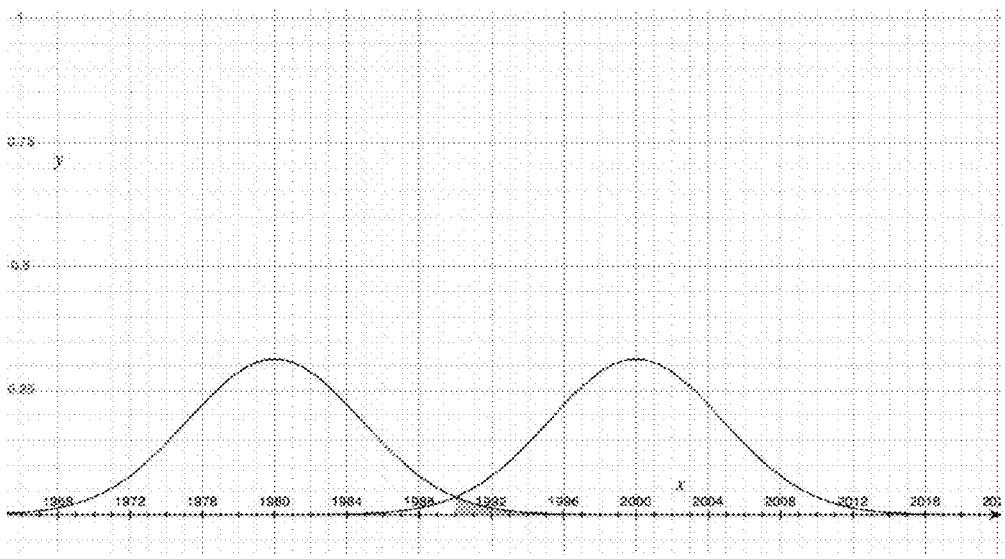
FIG. 31 shows the integration of curve one on the system time constraints
Figure 32:
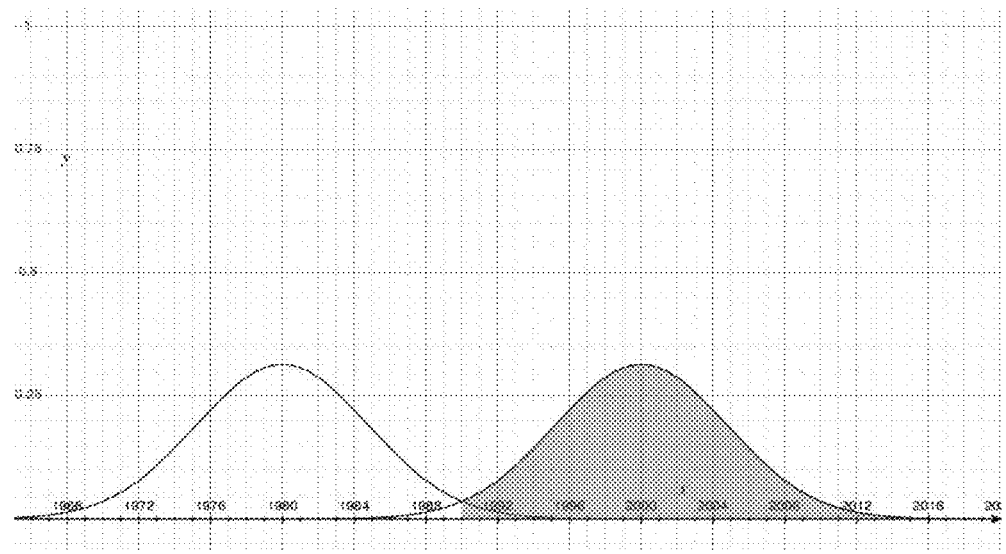
FIG. 32 shows the integration of curve two on the system time constraints.
Figure 33:
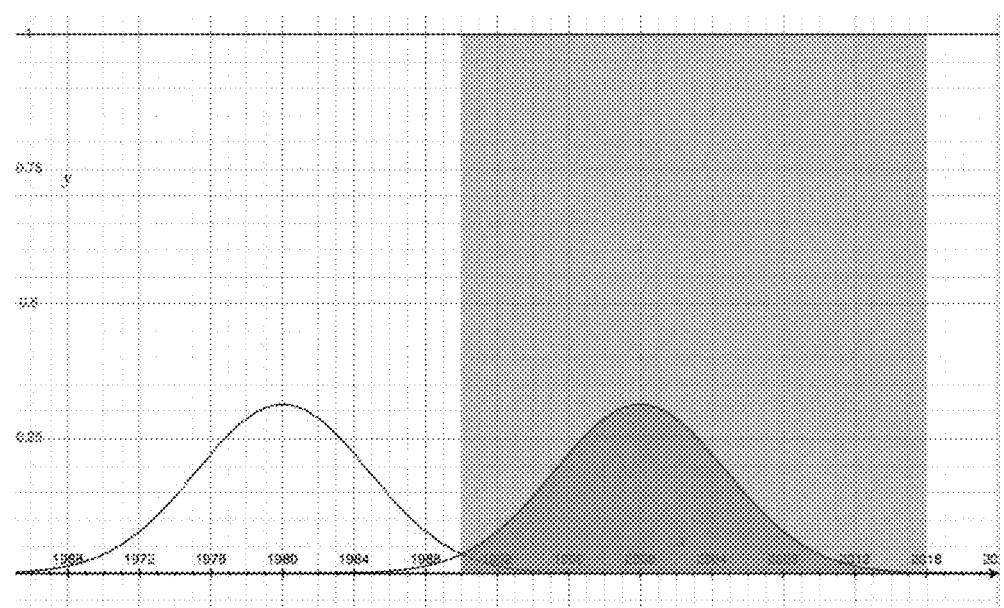
FIG. 33 shows the normalization of the integrated value of the curve.

In an implementation, two relationships that are of the same type are modified by a start date and an end date. In FIGS. 27 and 28, the relationship type is the same, however the length of the relationship of the relationship represented in FIG. 28 existed for a much longer time span than the relationship of FIG. 27. So, since the relationship type is the same, the shape of the curve is the same, however the weight of the relationship (which is dependent on the height or strength of the curve at given points) are updated based on these time inputs. In implementations, the system uses time curves instead of constants as edge weights so that overlapping time curves allows analysis to determine interesting information about overlapping relationships For example, the system can determine that two people who worked together at the same time at the same company have a stronger relationship than two people whose employment tenure never overlapped. Since the weight of a relationship is determined on a curve (when using the weighted path algorithm), the system must process the information from the curve to generate a constant number the system can use. So an integral of the curve with respect to a certain time is necessary. FIG. 29 shows a sample curve of the invention. In the figure, a and b are system constraints. If the system needed to determine the weight of this relationship at a specific time it would be evaluated based on this curve for a specific time. However in order to generate the overall influence of that relationship with respect to all time, the system would perform an integration on the function y that represents the curve based on system constraints. In an implementation, the recency effects the weight of a relationship. FIG. 30 shows two curves representing two relationships. As shown in FIG. 30, the two curves (Curve-1 and Curve-2) of relationship type X have exactly the same duration, but one relationship ended twenty years earlier than the other. If an integration was performed on Curve-1 and Curve-2, from a period of minus infinity to infinity, the integration would yield the same result for both curves. This fails to consider that the weight of Curve-2 should be stronger, since the relationship happened recently. In an implementation, a system time constraint is used to control the period the integration occurs over. FIG. 31 shows the integration of Curve-1. FIG. 32 shows the integration of Curve-2. FIG. 33 shows a domain of time with a high recency. So in these figures, assuming that the system time constraints are set such that a first value a is 1990 and a second value b is 2016, Curve-2 would have a higher resulting weight.

When the curves of FIGS. 31 and 32 are integrated, the weight value will be greater than one. Since, in an implementation, the system uses values of weights between 0 and 1, the result from the integration is divided by the curve (y=1) over the time constraints. Since the weight of the curve is 1, the result of the integration is divided by the length of time (or b-a). This is represented by the function below.

Function 4:

$$wt = \int_a^b \frac{wt(t)dt}{b-a} \qquad \text{Function 4}$$

These system time constraints used for integration is how the system can manage the weighted path so that relationships that are more recent have higher weights. Just like default weights, relationship curve shapes, system constraints are methods to define the influence algorithm to create the most appropriate output for the system.

Figure 34:
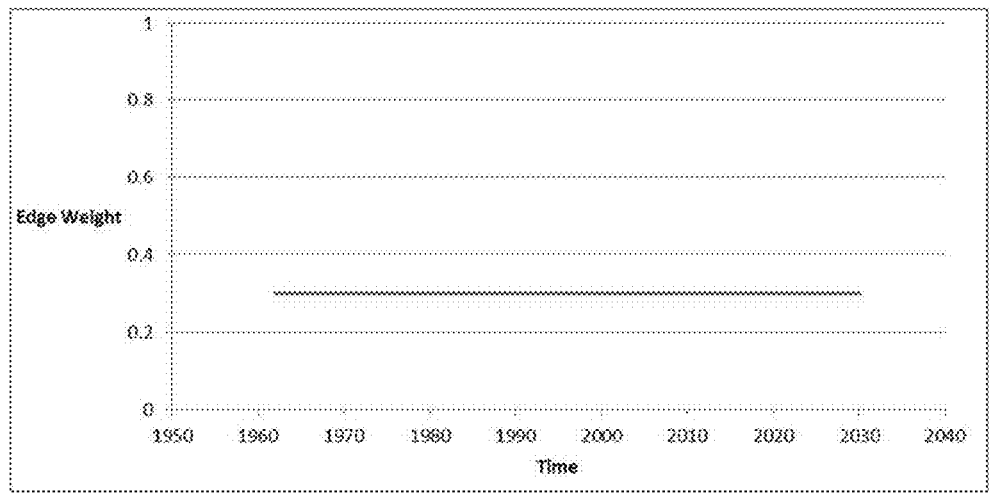
FIG. 34 shows a sample curve where the weight is half the default value of the relationship.

In an implementation, the system does not know the actual dates when a relationship occurs. This may occur when the information captured by the system is incomplete, especially with regards to start/end dates of relationships. In order to deal with these relationships where time is unknown, the system can use a curve with a constant weight value across time. The value of this curve is exactly half of the default weight of its corresponding relationship type, or attribute value corresponding to that edge. FIG. 34 shows a sample curve where the weight is half the default value of the relationship. For example, if the default weight of a relationship is 0.5, when the time information of that relationship is not know, the weight is 0.25.

In an implementation, each edge corresponds to a time curve, and the formula connecting time curves in a path is almost identical to calculating the weighted path where edges are constants. The system calculates the influence of an edge as a time curve because it allows the system to generate realistic influence metrics for overlapping and non-overlapping relationships with relation to when the relationship occurred (e.g., corresponding to time). For example, the system can consider that two people who worked at the same company at the same time, are closer than two who worked at the company during time periods with no overlap. As mentioned above, when calculating the weight of a path we the system can take the sum of the edge weights and scale back that result by the length of the path squared. The same idea apples to edge weights as functions of time, but instead of summing constants, the system sums functions, as shown in function 5 below.

Function 5:

$$\sum_{i=0}^{i<|p|} f(pw(t))i \cdot \left(\frac{1}{|p|}\right)^2 \quad \text{Function 5}$$

In function 5, the weight of a two step path is the sum of the two curves, scaled back by the inverse square of the path length.

Figure 35:
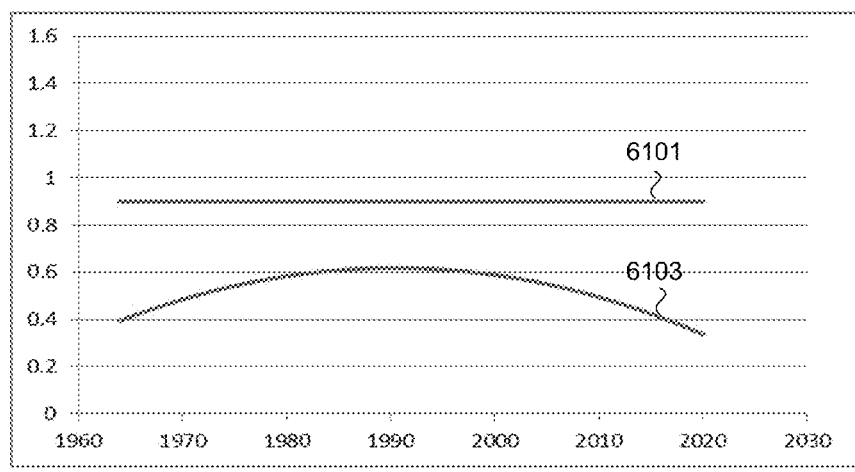
FIG. 35 shows two relationship curves.

FIGS. 35-41 show weights for relationships over time. The x-axis corresponds to time (e.g., a year) while the y-axis corresponds to the weight of the relationship. For example, FIG. 35 shows the relationship path "A has friend B" and "B Has Father C" the system can assume that the relationship of "Has Father" is a constant such that the weight is 0.9 (e.g., the weight of a father to a child is always constant at 0.9). The father relationship is represented by a curve 6101. In comparison, a curve 6103 represents the friendship relationship which is dependent on the time band of the relationship.

Figure 36:
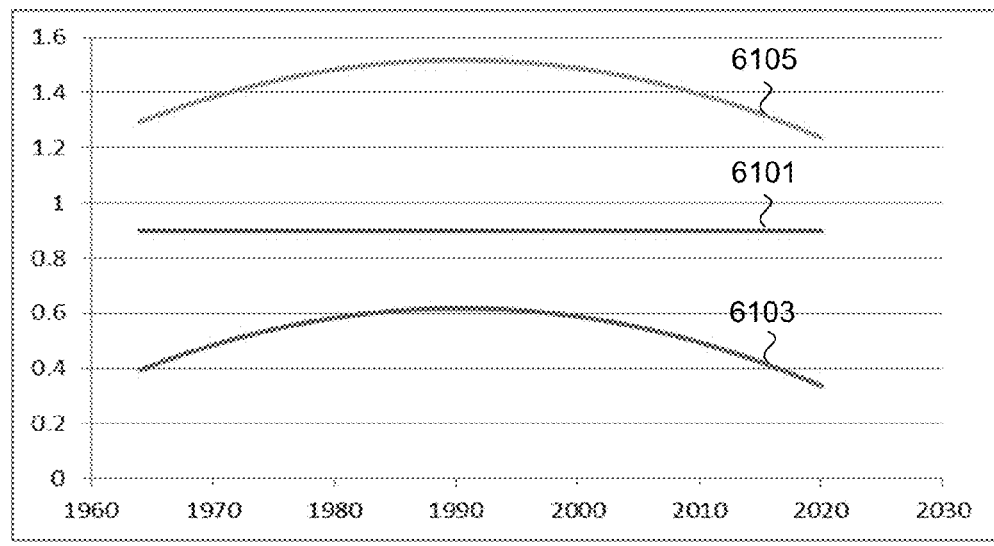
FIG. 36 shows a summed curve.
Figure 37:
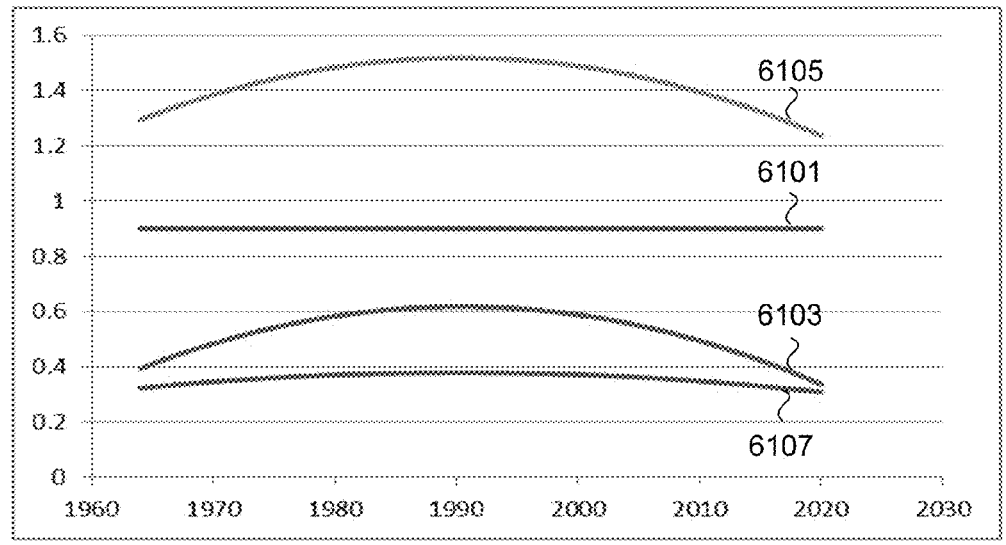
FIG. 37 shows the summed curve scaled.

To calculate the influence A has over C, the curves are summed. FIG. 36 shows a third curve 6105 which is the sum of curves 6101 and 6103. Then the curve is scaled by multiplying curve 6105 by the inverse square of the path length. This results in curve 6107 as seen in FIG. 37. This curve 6107 is the system's result for the influence of A over B that can be determined at any single given time by evaluating the curve at that point in time, or the overall influence of that relationship by performing an integration on curve 6107, with regard to the system time constraints.

Figure 38:
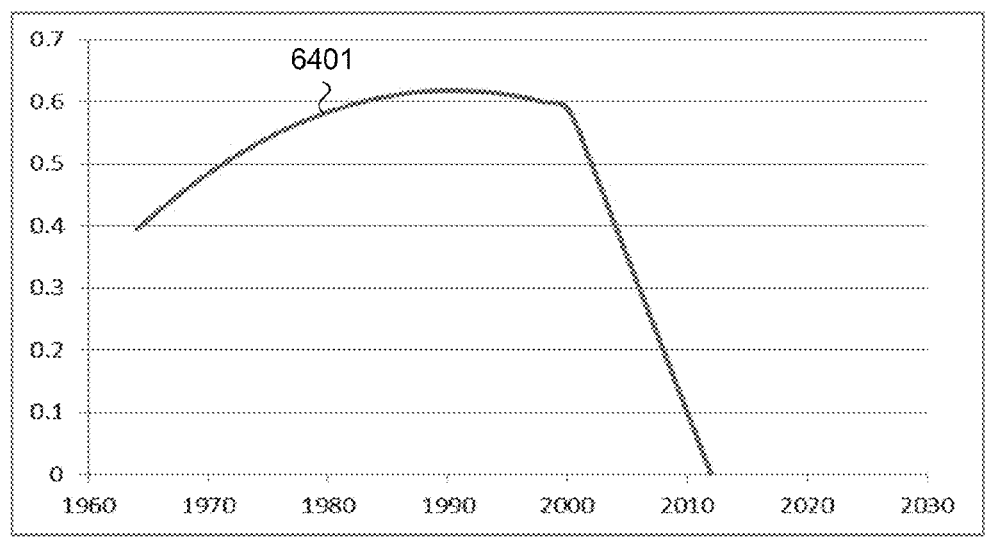
FIG. 38 shows a first edge-weight curve based on time.
Figure 39:
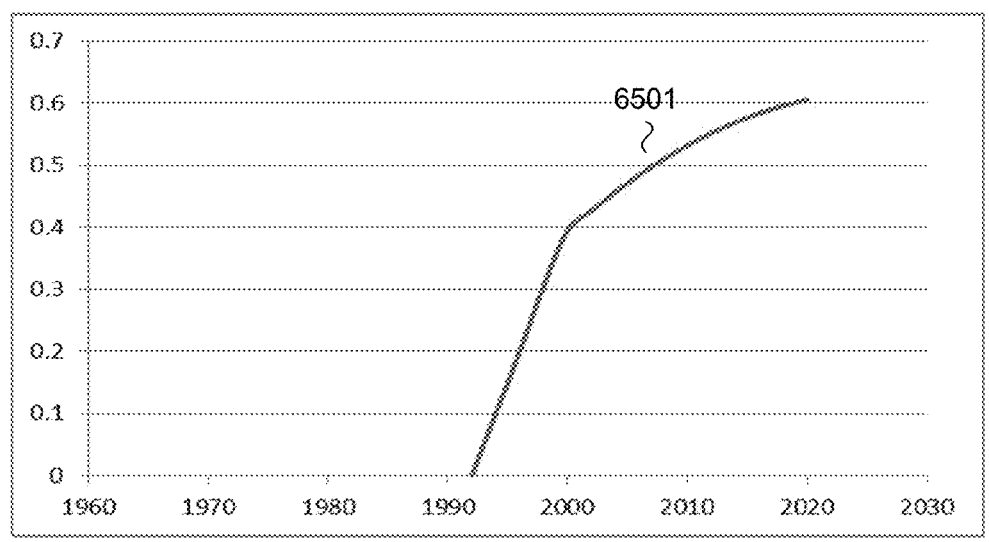
FIG. 39 shows a second edge-weight curve based on time.
Figure 40:
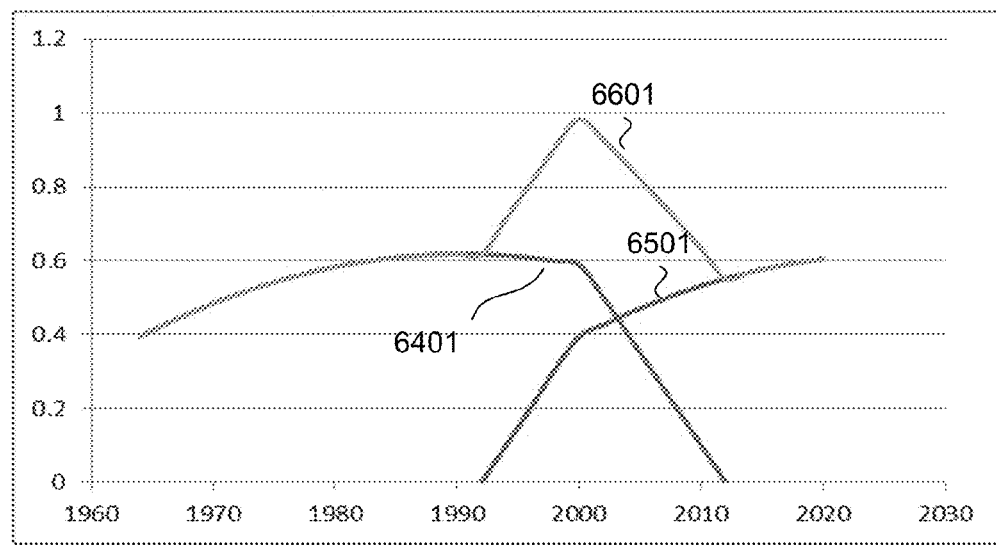
FIG. 40 shows a summed edge-weight curve based on time.
Figure 41:
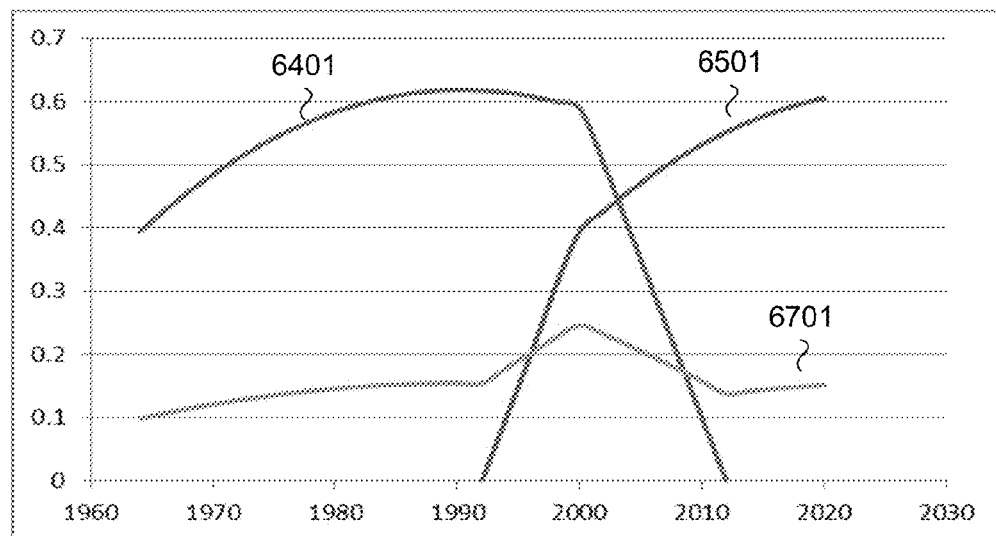
FIG. 41 shows a scaled summed edge-weight curve based on time.

In another implementation, employment is used to determine the weight of a relationship with respect to time. FIGS. 38-41 show the curves for two persons who worked at a company. Person A (shown in FIG. 38, represented by curve 6401) left the company in 2000, and person B (shown in FIG. 39, represented by curve 6501) joined in 2000. Although there is some chance that the two people know each other, the weight between these two nodes in the graph is less than that of two people who worked together at the same time. When the system calculates the influence of person A and B based on their work at the company, first the sum of the weights is taken as shown by curve 6601. Then the curve 6601 is scaled by the length of the path squared which reduces the weight as shown in curve 6701.

As seen in FIGS. 38-41, the weight between person A and B is low, but there is a noticeable peak in the overlap of their employment tenure. This shows that, if these two people were to have known each other, the likelihood is that they knew each other in the year 2000 (this is where the path weight is the highest). That is, if the curve were to be evaluated at the year 2000, we would find that this was when the relationship between these two people was the strongest.

To find the overall weight between persons A and B, the system can integrate using the system constraints defined by the system. Since the constraints are catered to give higher weight to relationships closer to the present date, this means that people who know each other well today will have higher weight calculations than people who knew each other in the past. This corresponds to the higher effectiveness to reach someone through a current colleague than it would be to reach them through a colleague from the past.

After all of the logic is applied to a path, there is one number generated for the weight that A has over B and B has over A for that path. This number is consumed by the application and is used to filter data in a number of different ways. As discussed elsewhere in this document, this information can be processed and used in many different ways.

In yet another implementation, the system can aggregate values for multiple paths between two nodes. As discussed earlier, once the final value of path connecting two nodes are determined, the overlaps of the time curves of each calculated, and the integration over the system time constraints performed, the system can output a constant number between zero and one. When aggregating multiple paths, the system uses these constants to determine the final value for the weight of one node over another. Thus, the function in calculating the overall weight is the same when calculating influence with regards to time. This can be represented by the same function used to aggregate paths where edge weights are constants as shown in function 3 given above. In an implementation, the weighted path algorithm discussed elsewhere in this document is used to perform a number of different functions. Two major functions the weighted path algorithm can perform are: (1) Taking two nodes as inputs and finding paths between them, and (2) Taking one node as an input and finding a list of nodes that meet some criteria, filtering the results by the highest weights.

When the weighted path algorithm is used to show how two people know each other, the algorithm takes the two nodes and finds all paths between them that have a length less than the breadth first search constant that defined in the system (D). A user sees on the user interface a result of paths ordered by strength, which can be sorted by strongest paths showing up first in the list. The paths that are insignificant are never returned to the user either because the length of the path was greater than a constant, or because the path weights were too low to be displayed.

When the weighted path algorithm is used to show the ten most influential people over another person, the algorithm starts with one Node (Person A). The algorithm finds all of the highest weighted paths going out from this node then uses a filter. The algorithm then takes the ten (more than ten or less than ten can also be used, depending on the specificity required for the system) highest weighted paths to generate a final value for all the paths. To determine the final value for all of those paths, the system calculates the weights of all the other paths (e.g., all those but the highest weighted paths) existing between the source nodes and the various targets, and applies an algorithm (for example, function 3 above) to get a single weight between each combination of target and source nodes. The application sorts the resulting nodes by their overall path weight in descending weight order. This is equivalent to determining the overall power of people in the graph (e.g., assuming the same exact relationship with two people, the person who has a higher power ranking in the world will have more influence over another person).

In an implementation, the system can determine who someone might know according to a geographic location. The system takes two input nodes, information on the user node, and a geographic location node (e.g., a city, state, country). This is performed by the system in the following steps:

Step one: Filter the graph by people who have a "Lives in" "Works in" or "Vacations in" relationship with that location node.

Step two: Run a weighted path algorithm between the user node, and all of the people in that subset filtered in step one.

Step three: Filter the results by weight descending and return it to the end user.

These results can further be used to show, for each of those people, paths from the user to the specified person. This functionality gives the user the resources (e.g., a path from the user to the high power person) to be able to contact this high power person.

In an implementation, the system can be used to show a user people they may know to contact in order to help for a cold call to an organization (e.g., company, charity, nonprofit). This page displays people the user may want to contact at a given company. The system generates this list by first displaying people that the user has a relationship with who can make introductions to individuals that work (or have influence) at said company. This list includes further degrees of separation (e.g., second degree or more) organizational connections (e.g., people who work with another company that does business with the target company). The page then lists people that the user does not know that work at the company, and may be receptive to a cold call from the user due to common relationships, organizations, and interests. The people with the most connections are listed first in descending order. This part of the page has headings for person name/description, people in common, organizations in common, and interests in common. The system generates this page in the following steps:

Step one: Takes two input nodes (the user node, and the company node).

Step two: Find all of the paths between the user node and the company node where the depth is less than a constant "D", and there is exactly one person node in the path.

Step three: Find the weights of all of the paths.

Step four: Aggregate the weights of paths in which the person in the middle of the path is the same, creating one value per person connecting the user to the company node.

Step five: Filter the results by descending weight and return to the user the person in the middle of the path(s) between the nodes as well as the path of connectivity between the three nodes.

In an implementation, the system can show a user people they may know. This can be performed by the system using the following steps:

Step one: Start with the user node

Step two: Find all of the paths of length two to which there is not a relationship recorded in the system and where the target node is of type "Person."

Step three: Find the weights of all of the paths in step two.

Step four: Order the result set of people by descending weight.

Step five: Show to the user (e.g., on a screen, through a system notification) to suggest to the user that they "connect" to this person.

In an implementation, the system can show a user the highest influencers on a group of persons (e.g., the Board of Directors of company A) that are not members of the group. This can be performed by the system with the following steps:

Step one: Start with the node the group (in this example the board of company A).

Step two: Find the highest weighted paths going into this node where the depth is between two (e.g., not directly connected) and a constant "D" and the target node is of type "Person" node.

Step three: Aggregate the weights of all of the paths such that there is one value for each person.

Step four: Return to the user this list of people ordered by their aggregated path weight in descending order.

In an implementation, the system uses a centrality algorithm. Centrality can be used to, for example, determine a power rating of person nodes in the system. Furthermore, centrality can also be used to determine the influence a person has in a particular domain of the system.

In an implementation, the system calculates influence in a directed graph. The system differs from other centrality algorithms (such as Page Rank) in the following ways:

(1) Edges can mean different things depending on their relationship type as defined by the ontology of the system. For example, the system can have hundreds of different types of edges, each of which means something different, and each of which has different weights.

(2) Edges in the system represent social relationships between different entities.

(3) The system uses weight modifiers to tweak and tune the way influence flows in the system.

(4) The system produces influence metrics as time curves.

(5) The system can justify for incomplete information with bias, or "Sign Posts". For example, data sets that do not reflect all the relationships of a node can be used in the system.

(6) The system can calculate influence over abstract domains (e.g., user defined subset of the system graph) using edge selection functions.

In an implementation, the system can find the most influential node in a graph. This can also be understood as the centrality of a node in a graph and can be called the power rank of a node. In order to calculate this, the system runs an algorithm based on the master graph of the system. The results of the algorithm can be cached (e.g., the algorithm is not run in real-time) or saved in a database. This can be performed by the system using the following steps:

Step one: Start with energy (or the influence of the nodes) distributed equally amongst all nodes in the graph. If there are an n number of nodes in the graph, each node starts out with an energy value of 1. The total energy in the graph starts out as n.

Step Two: Calculate energy distribution based on which nodes in the graph have the most incoming and outgoing edges, and the weights of those edges. The total energy in the graph remains n; but the distribution of the energy is staggered.

Step Three: The system re-calculates the energy distribution based on which nodes in the graph have the most incoming and outgoing links and the energy of the incoming node. This can be done using recursion.

Step Four: Filter the results by people nodes. The total energy in the graph is still n, but the distribution of the energy is staggered.

After the algorithm of steps one to four directly above is computed, the energy of the graph has been distributed. The algorithm then uses a Bayesian distribution (or the other distributions as identified elsewhere in this document) to convert the energy of a particular node to a number. This number can be a number between one to one-hundred and represents the power rank of the node. In an implementation, all the nodes in the master graph have an entity attribute for their influence index value or power ranking (e.g., a global influence index value).

In an implementation, influence index value (or power rankings) for nodes are normalized according to a distribution curve. In a centrality calculation where each node starts out with energy of one, the algorithm's values for each node needs to be adjusted. Just as a teacher scales the grades of a class on a normal distribution (or bell curve), the system uses algebra to distribute the results of the centrality algorithm to a scale based on the standard deviation of the result set. If each node started out with a value of one, and the energy of the entire graph remains constant after the centrality algorithm, the system knows the mean of the centrality distribution will be one. Since the power ranking, in an implementation, on a scale from one to one-hundred, the system knows that the mean of the final distribution will be 50.

In an implementation, local and global centrality are two separate means of capturing a power ranking. Finding the global centrality can be technically expensive. The reason is that this algorithm is recursive, meaning the system needs to repeat calculations multiple times in order to get an accurate value. The system can instead use a local centrality algorithm, which is less intensive, and can be run on-the-fly. This can be performed by the system using the following steps:

Step one: The system takes the inputs of a node, and a variable of how deep the algorithm is specified to traverse (e.g., how many edges the algorithm should traverse recursively).

Step two: An energy distribution algorithm is used on the extracted sub graph based on the information from step one.

This local centrality algorithm can present its results to a user. This algorithm is extremely clean, and very fast, to the point where it can be generated upon the user's request when clicking a hyper link to a person's page.

In an implementation, the system can deal with incomplete information on a node by using node bias. If after running the centrality algorithm it becomes clear that the metrics that it comes up with are incorrect, the system can adjust the results. This inaccuracy is because information that the system collects will always be incomplete. Since many powerful persons limit their publicly available data, the system may never be able to collect all the information on a powerful person. Because of this, the system has a way to manipulate the graph in such a way that the influence metrics that the algorithm produces appear to the user to be accurate to how they are in real life. This is different than some other algorithm like Page Rank. In Page Rank, the data set that is being analyzed is always perfect. There is no missing information in that web pages (nodes) Hyperlink to (edge) other Web pages. In the set of data that is the Internet, there is no imperfect information when it comes to the connectivity of Web pages.

For example, the system can use the idea of "bias" with the centrality algorithm. The idea of bias is that the system updates the graph such that nodes the system deemed to be influential has their influence in the graph increased. Using this method, even other nodes connected to a biased node are affected. That is if we decided to increase the weight of person A, and person B is very close to that person, the weight of person B will also be increased when the centrality algorithm is run. This is an example of how a Priors algorithm can be used in the system, which as mentioned previously before is meant to distribute energy in a graph with imperfect/incomplete information.

In an implementation, the centrality is influenced by time. As mentioned earlier in the section about weighted paths, the system calculates influence as a function of time. Unlike our weighted paths, the centrality algorithm runs on a constant value. That is the algorithm is based on the weight value of the edge's time curve where time is at a single instant (e.g., the present time).

In an implementation, the system can run the centrality algorithm not based on a set of constants, but rather a set of curves.

In an implementation, the system can find the influence in a domain. This domain can be something the system or a user of the system determines. For example, given the following query: "Show me the most influential people in the art world." The system can return the values of these queries to produce something in which artists, curators, art collectors, are all a part of the result set. In order to have the flexibility for the sorts of queries a user may be interested in, the system uses a complex ontological framework that allows the system to run queries that calculate influence on abstract domains. This is because included in our ontology, there is a "concepts" ontology, which ties together like things. A purpose of the concepts ontology is to give the system the ability to calculate influence over abstract domains. For example, the concept of "art" is linked to entity classifications like "artist," "curator," or "art critic" as well as to relationship types like "created," "curated," and other related entity classifications or relationship types.

When a query like the one above is submitted to the system, the concepts ontology uses the node "art." By traversing from the concepts ontology to the type system, there is a subset of entity classifications and relationship types that are returned, such as artist, curator, curated, or created. The system pulls from the graph all of the nodes that have these classifications (e.g., artists, critics, and art collectors). Additionally, this filter returns a list of relationship types. The centrality algorithm can then find the most influential node in the sub graph extracted by filtering the given entity classifications. Filtering nodes, and edges based on the concepts ontology creates an abstracted sub graph that allows the system to generate influence on an abstract domain like "The Art World."

In an implementation, the graph only traverses on edges that have been specified by the concepts filter. For example, using the query: "Show me the most influential people in the in the art world" as discussed above, assume that there are four nodes. Nodes A and D and connected to each other by the following path: A-B-C-D. For example, A is connected to B and B is connected to C by Relationship Types in the art concept (e.g., A is an artist of B, and B is displayed at the museum C). Nodes C and D are not connected by a Relationship Type in the art concept but by another Relationship Type not in the art concept (e.g., museum C is in the same city as person D). When the system traverses the nodes for the art concept, the traversal stops at node C, without traversing to node D. In another implementation, using the same example discussed in this paragraph, while the system is traversing the graph with the art concept, node D is traversed. This is because node D is connected to another node, node E, by a Relationship Type in the art concept (e.g., person D curated an exhibit E).

In an implementation, the system can find the influence in a domain that has incomplete information. As mentioned previously, the system can use bias in a Priors algorithm to manually weigh certain nodes in the graph. The benefits of this approach are at least two pronged, first the system is able to update the influence of one person such that it appears to be correct or realistic, and also this adjusted influence rating resonates throughout the rest of the graph. Bias was introduced to deal with incomplete information, but updating the influence of a node in the graph as a whole will not properly affect the way that influence is transferred to a specific domain. Rather it will simply increase that person's influence on every domain equally. So the system has a process in which the nodes are biased with regards to specific to domains by means of our concept ontology. For example assume that we know that person A is the most influential person in the art world. However, when the system runs the algorithm to find the most influential people in the art world, person A is nowhere near the top of the list. In order to adjust this person's influence in this domain, as well as properly attribute the energy of the people close to him in the network, the system can perform the follow steps:

Step one: Connect an edge between Person A, and the node in the concepts ontology that is "Art." The edge label can be type "Has_Influence_In." The weights of this edge increases the influence of this person in the art world.

Step two: Tweak the weights on this edge until this person's influence in the given domain is accurate.

Now, when the system runs the algorithm to find influence in the "Art World," person A will come to the top, and furthermore, the people who are close to him in his network will also have higher influence on the "Art" concept, thus improving the system's analytics.

In an implementation, reverse engineering on concepts can be performed with ranked lists. The system generates influence in domains based on a set of algorithms. This differs from other approaches of creating a ranked list which is simply to type the list up and publish it. However, the people, and the affiliated organizations that create these lists usually know what they are talking about, and have reasons to assign the rankings that they do. Thus the system can beneficially use their lists. For example, in the query: "Show me the most influential people in music." Using the concepts ontology discussed above (which can be a meta-ontology that sits on top of our master ontology or reference data), the system can generate results for this query.

As discussed above, the system can bias the graph to take into account a person's influence on a domain by creating a direct edge from the person to the concept and adding to it a weight. In doing this, when calculating influence in the graph, this edge will increase a person's influence on a particular domain, and in addition, this influence will ripple out through the graph to the entities surrounding this person. One of the pieces of information that we capture are "ranked lists." For example, this can be classified as "awards." Some of these ranked lists can be for things such as "The Richest People in the U.S." or some things are much more abstract "The most influential people in music." This information is important to the system for at least two reasons. First, it is useful information for a person or organization profile. Second, this information helps to refine how the system calculates influence on a domain. Many times, these lists are written and published by people who know the space (e.g., art, music) very well, and have made educated decisions in ranking these entities. In order to make best use of these lists the system's influence calculations interacts with the makes use of this data but connecting it to the concept ontology.

For example for a list published by magazine A for the "Most Influential People in Music." This is information useful to a user of the system, and the system can use the list from magazine A as an input that help define influence metrics (that define our ranked lists) of the system. The list has an abstract concept to which it is attributed "music." The system uses this data to bump up the weights that people have in domains by attaching a weighted edge to the concept, we attach this "list" or award to the concept of "music" with a particular weight. This weight can depend on the validity (or strength) of the source publication. A list of this title coming from the New York Times, would have more influence on the concept that a list from the National Inquirer. The people on the list would also have a weight attached to the list that corresponds to their rank on the list as assigned by the source publication. The higher their rank, the higher their weight is over that list. In combining these two edges as a weighted path, the system finds that the people mentioned on the list have a high weight over the "Concept" node to which the list entity was attached (such as music in the example above). So when the system develops its list of the most important people in music, the system will run on a number of different inputs, one of which will be the list published by company A.

In an implementation, the centrality or the influence ranking of a node can be use to manipulate the weighted paths between nodes. As discussed above, the weight one person has over another is the weight of the strongest path plus the average of all the other weighted paths scaled by the difference of the strongest path and one. The mathematical logic makes sense, but consider the following: "Person A is related to two nodes B and C with exactly the same paths. According to the edge weights of the path, and the math mentioned above are equal to 0.4." Next, consider the following: "Node B has a global power rank of 96. Node C has a global power rank of 34." Although the paths are the same, it makes sense that node B has more influence over node A than does node C. This does not affect how close two people are in the graph, it only affects the amount of influence a particular node has over another.

In an implementation, the system uses caching to reduce the computation necessary when running algorithms. The weighted path algorithms mentioned above are computationally intensive, and while they can be generated on-the-fly, it becomes a huge burden on the graph to run these calculations for every page that is rendered by a user. In order to make these path weights and the associated nodes and edges readily available in real time to the paid user, a cache with some of this information pre-generated in a distributed key value store in a database can be used (e.g., Apache's Hadoop, LinkedIn's Voldemort Project). Databases that can be used to calculate graph closure in a distributed key value store can be used. In an implementation, the system uses a database that stores each of the paths and the corresponding weights that quantify how nodes are connected.

In an implementation, the following function allows the system to calculate the overall influence one node has over another based on all of the paths that exist between them in the graph.

Similar to function 3, Ps represents all of the paths that exist between two nodes. This function 3 similar to function 1, with function 1 nested inside of itself. The inner function takes the sum of all of the edges in one particular path, and the outer function takes all of those weights, sums them, and divides them by the amount of paths the two nodes were connected by.

In an implementation, the reason for an influence index value (or power ranking) of a system-provided node is displayed to a user. For example, for a specific node, a list of nodes relevant to determining its power ranking are displayed. In another implementation, information such as how much a node contributes to the power ranking of another node is displayed. This information can be shown on a display for the user in various ways, such as in a list. In another implementation, the system provides a processed view of the information using a graph, charts, bar charts, and the like.

In an implementation, the system tracks contributions of money. These contributions can come from various one entity to another entity. For example, the system tracks political contributions from a person to a politician. In another example, the system tracks donations from a company to a charity. In yet another example, the system tracks capital contribution made by an investor to a company (e.g., purchasing stock, contributing capital for a partnership).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
providing a system including a social graph, wherein the social graph comprises with system-provided nodes, wherein each node is coupled to other system-provided nodes via one or more edges and each edge comprises a value for a concept category:
a plurality of nodes of a first type, referred to as system-provided nodes, wherein system-provided nodes represent entities tracked by the system and include information gathered by the system;
a plurality of nodes of a second type, different from the first type of node and referred to as ghost nodes, wherein ghost nodes represent entities created for users of the system and include information specified by users of the system;
a plurality of edges of a first type, referred to as system-provided edges, wherein system-provided edges represent relationships categorized by at least one concept category of the system between two different system-provided nodes of the social graph; and
a plurality of edges of a second type, different from the first type of edge and referred to as ghost edges, wherein each ghost edge represents relationships between a system-provided node and a ghost node of the social graph, and information on the relationships are specified by users of the system;
using at least one electronic processor, maintaining the social graph comprising:
allowing a plurality of system-provided nodes of the social graph to be directly coupled to other system-provided nodes by system-provided edges, wherein system-provided nodes and system-provided edges include information gathered by the system;
allowing a plurality of ghost nodes of the social graph to be directly coupled to system-provided nodes by ghost edges, wherein ghost edges include information specified by users of the system;
disallowing a plurality of ghost nodes from being directly coupled to other ghost nodes or to system-provided nodes using system-provided edges; and
disallowing a plurality of system-provided nodes from being directly coupled to other system-provided nodes using ghost edges;
providing a first system-provided node;
providing a second system-provided node;
providing a first ghost node;
providing a first ghost edge to couple the first ghost node and the first system-provided node;
identifying a first system-provided edge to couple the first and second system-provided nodes;
calculating a first edge-weight value to assign to the first system-provided edge comprising:
determining a first edge-weight function for the first system-provided node, wherein the first edge-weight function determines an edge-weight output value for the first system-provided node as a function of time;
determining a second edge-weight function for the first system-provided node, wherein the second edge-weight function determines an edge-weight output value for the second system-provided node as a function of time; and
determining using the first and second edge-weight functions to obtain a third edge-weight function;
at a first time, using the third edge-weight function, assigning the first edge-weight value for the first time; and
at a second time, using the third edge-weight function, assigning the first edge-weight value for the second time.

2. The method of claim 1 wherein the calculating a first edge-weight value to assign to the first edge further comprises:
normalizing the third edge-weight function to obtain a third edge-weight function relative to other nodes in the graph.

3. The method of claim 2 wherein the first edge-weight value is for a direction from the first to the second system-provided node, and the first system-provided edge comprises a second edge-weight value for a direction from the second to the first system-provided node.

4. The method of claim 3 wherein the second edge-weight value is independent of the first edge-weight value.

5. The method of claim 3 wherein the second edge-weight value is different than the first edge-weight value.

6. The method of claim 1 further comprising
identifying a second system-provided edge corresponding to a second concept category to couple the first and second system-provided nodes and
the calculating the first edge-weight value corresponding to a first concept category to assign to the first system-provided edge further comprises:
determining a fourth edge-weight function for the second system-provided node, wherein the fourth edge-weight function determines an edge-weight output value for the second system-provided node in the second concept category as a function of time; and
when determining using the first and second edge-weight functions to obtain a third edge-weight function, ignoring the fourth edge-weight function.

7. The method of claim 1 further comprising wherein at the second time, after the first time, the assigned first edge-weight value is lower than the assigned first edge-weight value at the first time.

8. The method of claim 1 wherein the calculating the first edge-weight value corresponding to a first concept category of a plurality of concept categories tracked by the system to assign to the first system-provided edge further comprises:

detecting the first ghost edge coupling the first ghost node to the first system-provided node; and when determining using the first and second edge-weight functions to obtain a third edge-weight function, ignoring the first ghost edge and the first ghost node.

9. The method of claim 1 wherein the first system-provided edge corresponds to a first concept category of a plurality of concept categories tracked by the system, the first edge-weight value corresponds to the first concept category, and the first and second edge-weight functions corresponds to the first concept category.

10. A method comprising:

providing a system including a social graph;

using at least one electronic processor, storing entities in the social graph comprising:

creating a plurality of nodes of a first type, referred to as system-provided nodes, wherein system-provided nodes represent entities tracked by the system and include information gathered by the system;

creating a plurality of nodes of a second type, different from the first type of node and referred to as ghost nodes, wherein ghost nodes represent entities created for users of the system and include information specified by users of the system;

creating a plurality of edges of a first type, referred to as system-provided edges, wherein system-provided edges represent relationships categorized by at least one concept category of the system between two different system-provided nodes of the social graph;

creating a plurality of edges of a second type, different from the first type of edge and referred to as ghost edges, wherein each ghost edge represents relationships between a system-provided node and a ghost node of the social graph, and information on the relationships are specified by users of the system;

allowing a plurality of system-provided nodes of the social graph to be directly coupled to other system-provided nodes by system-provided edges, wherein system-provided nodes and system-provided edges include information gathered by the system;

allowing a plurality of ghost nodes of the social graph to be directly coupled to system-provided nodes by ghost edges, wherein ghost edges include information specified by users of the system;

disallowing a plurality of ghost nodes from being directly coupled to other ghost nodes or to system-provided nodes using system-provided edges; and disallowing a plurality of system-provided nodes from being directly coupled to other system-provided nodes using ghost edges;

providing a first system-provided node in the social graph;

providing a second system-provided node in the social graph;

providing a first ghost node representing a first user in the social graph;

providing a first ghost edge to couple the first ghost node and the first system-provided node in the social graph;

identifying a first system-provided edge to couple the first and second system-provided nodes in the social graph;

calculating a first edge-weight value to assign to the first system-provided edge comprising:

determining a first edge-weight function for the first system-provided node, wherein the first edge-weight function determines an edge-weight output value for the first system-provided node as a function of time;

determining a second edge-weight function for the first system-provided node, wherein the second edge-weight function determines an edge-weight output value for the second system-provided node as a function of time; and determining using the first and second edge-weight functions to obtain a third edge-weight function;

at a first time, using the third edge-weight function, assigning the first edge-weight value for the first time; and at a second time, using the third edge-weight function, assigning the first edge-weight value for the second time.

11. The method of claim 10 further comprising:

disallowing system-provided edges from directly coupling two ghost nodes; and disallowing ghost edges from directly coupling two ghost nodes or two system-provided nodes.

12. The method of claim 10 wherein the first ghost node is directly coupled by a ghost edge to the first or second system-provided nodes.

13. The method of claim 10 wherein the first user is allowed to modify information associated with the first ghost node and disallowed to modify information associated with the first system-provided node.

14. A method comprising:

providing a system including a social graph, wherein the social graph comprises:

a plurality of nodes of a first type, referred to as system-provided nodes, wherein system-provided nodes represent entities tracked by the system and include information gathered by the system;

a plurality of nodes of a second type, different from the first type of node and referred to as ghost nodes, wherein ghost nodes represent entities created for users of the system and include information specified by users of the system;

a plurality of edges of a first type, referred to as system-provided edges, wherein system-provided edges represent relationships categorized by at least one concept category of the system between two different system-provided nodes of the social graph; and a plurality of edges of a second type, different from the first type of edge and referred to as ghost edges, wherein each ghost edges represent relationships between a system-provided node and a ghost node of the social graph, and information on the relationships are specified by users of the system;

using at least one electronic processor, maintaining the social graph comprising:

receiving unfiltered information from an on-line source;

filtering the unfiltered information to obtain the information on entities;

filtering the unfiltered information to obtain filtered information on entities;

retrieving a plurality of ontology data structures, wherein each ontology data structure of the plurality of ontology data structures include a method of representing a relationship in an unstructured data format to a data format of the social graph, wherein the data format of the social graph comprises entities represented by at least one system-provided edge and at least two system-provided nodes;

selecting ontology data structures from the plurality of ontology data structures to represent the filtered information on entities;

creating system-provided nodes and system-provided edges in the social graph to represented the filtered information on entities based on the selected ontology data structures;

allowing a plurality of system-provided nodes of the social graph to be directly coupled to other system-provided nodes by system-provided edges, wherein system-provided nodes and system-provided edges include information gathered by the system;

allowing a plurality of ghost nodes of the social graph to be directly coupled to system-provided nodes by ghost edges, wherein ghost edges include information specified by users of the system;

disallowing a plurality of ghost nodes from being directly coupled to other ghost nodes or to system-provided nodes using system-provided edges; and disallowing a plurality of system-provided nodes from being directly coupled to other system-provided nodes using ghost edges;

providing a first system-provided node;

providing a second system-provided node;

providing a first ghost node;

providing a first ghost edge to couple the first ghost node and the first system-provided node;

identifying a first system-provided edge to couple the first and second system-provided nodes;

calculating a first edge-weight value to assign to the first system-provided edge comprising:

determining a first edge-weight function for the first system-provided-node;

determining a second edge-weight function for the first system-provided-node; and based on the first and second edge-weight functions, determining the first edge-weight value.

15. The method of claim 14 wherein each ghost edge of the social graph is directly coupled to at least one ghost node.

16. The method of claim 14 wherein each ghost edge of the social graph is directly coupled to at most one system-provided node.

17. The method of claim 14 wherein each ghost edge of the social graph is directly coupled to at most one ghost node.

18. The method of claim 14 wherein each ghost node of the social graph is one-degree of separation from at least one system-provided node of the social graph.

19. The method of claim 14 wherein the first edge-weight function corresponds to a first type of relationship represented using the ontology data structure.

20. The method of claim 19 wherein the second edge-weight function corresponds to a second type of relationship represented using the ontology data structure.

* * * * *